(12) United States Patent
Fakoorian et al.

(10) Patent No.: US 11,595,912 B2
(45) Date of Patent: Feb. 28, 2023

(54) SIDELINK POWER CONTROL

(71) Applicant: QUALCOMM Incorporated, San Diego, CA (US)

(72) Inventors: Seyed Ali Akbar Fakoorian, San Diego, CA (US); Piyush Gupta, Bridgewater, NJ (US); Kapil Gulati, Hillsborough, NJ (US); Junyi Li, Chester, NJ (US); Xiaoxia Zhang, San Diego, CA (US); Aleksandar Damnjanovic, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 72 days.

(21) Appl. No.: 16/990,587

(22) Filed: Aug. 11, 2020

(65) Prior Publication Data

US 2021/0051600 A1 Feb. 18, 2021

Related U.S. Application Data

(60) Provisional application No. 62/886,223, filed on Aug. 13, 2019.

(51) Int. Cl.
*H04W 52/24* (2009.01)
*H04W 52/10* (2009.01)
(Continued)

(52) U.S. Cl.
CPC ........ *H04W 52/245* (2013.01); *H04B 17/318* (2015.01); *H04L 5/0048* (2013.01);
(Continued)

(58) Field of Classification Search
CPC ... H04W 24/10; H04W 52/10; H04W 52/242; H04W 52/245; H04W 72/0413;
(Continued)

(56) References Cited

U.S. PATENT DOCUMENTS

2016/0127999 A1* 5/2016 Li .................. H04W 52/54
370/294
2018/0176892 A1* 6/2018 Kim ................ H04W 52/04
(Continued)

FOREIGN PATENT DOCUMENTS

WO WO-2017011079 A1 1/2017

OTHER PUBLICATIONS

International Search Report and Written Opinion—PCT/US2020/046012—ISA/EPO—dated Oct. 26, 2020 (194121 WO).
(Continued)

*Primary Examiner* — Michael Thier
*Assistant Examiner* — Prince A Mensah
(74) *Attorney, Agent, or Firm* — Holland & Hart LLP

(57) ABSTRACT

Methods, systems, and devices for wireless communication are described. Generally, the described techniques provide for efficiently performing and reporting reference signal received power (RSRP) measurements. In particular, the techniques described herein may allow a user equipment (UE) to efficiently identify reference signals on which to perform RSRP measurements (e.g., based on signaling from a base station), identify when to report RSRP measurements (e.g., aperiodically, periodically, or semi-persistently), and identify a channel on which to report RSRP measurements (e.g., a sidelink channel or an uplink channel). In addition, the techniques described herein may also allow a UE to efficiently identify open loop parameters to use to determine an appropriate transmit power for transmitting to another UE over a sidelink.

42 Claims, 15 Drawing Sheets

(51) Int. Cl.
*H04W 24/10* (2009.01)
*H04B 17/318* (2015.01)
*H04L 5/00* (2006.01)
*H04W 72/04* (2023.01)
*H04W 92/18* (2009.01)

(52) U.S. Cl.
CPC ............ *H04W 24/10* (2013.01); *H04W 52/10* (2013.01); *H04W 52/242* (2013.01); *H04W 72/042* (2013.01); *H04W 72/0413* (2013.01); *H04W 72/0493* (2013.01); *H04W 92/18* (2013.01)

(58) Field of Classification Search
CPC ............. H04W 72/04; H04W 72/0493; H04W 72/042; H04W 92/18; H04B 17/30–354; H04L 5/003–0053
See application file for complete search history.

(56) References Cited

U.S. PATENT DOCUMENTS

| | | | | |
|---|---|---|---|---|
| 2018/0206140 | A1* | 7/2018 | Panteleev | H04W 72/044 |
| 2018/0241523 | A1* | 8/2018 | Noh | H04W 24/10 |
| 2019/0215897 | A1* | 7/2019 | Babaei | H04W 76/28 |
| 2019/0356451 | A1* | 11/2019 | Zhang | H04L 5/0032 |
| 2020/0022089 | A1* | 1/2020 | Guo | H04L 5/0048 |
| 2020/0107383 | A1* | 4/2020 | Novlan | H04W 56/003 |
| 2020/0280398 | A1* | 9/2020 | Hwang | H04L 1/1861 |
| 2020/0314770 | A1* | 10/2020 | Wu | H04L 5/10 |
| 2020/0322095 | A1* | 10/2020 | Park | H04L 5/0055 |
| 2020/0337096 | A1* | 10/2020 | Zhang | H04W 4/40 |
| 2020/0413348 | A1* | 12/2020 | Ryu | H04W 52/242 |
| 2021/0391906 | A1* | 12/2021 | Oteri | H04L 5/0048 |
| 2022/0159583 | A1* | 5/2022 | Wang | H04W 52/383 |

OTHER PUBLICATIONS

SAMSUNG: "On Physical Layer Procedures for NR V2X", 3GPP Draft, R1-1901048, 3GPP TSG RAN WG1 Ad-Hoc Meeting 1901, 3rd Generation Partnership Project (3GPP), Mobile Competence Centre, 650, Route Des Lucioles, F-06921 Sophia-Antipolis Cedex, France, vol. RAN WG1, no. Taipei, Taiwan, Jan. 21, 2019-Jan. 25, 2019, Jan. 11, 2019 (Jan. 11, 2019), XP051576582, 11 Pages, Retrieved from the Internet:URL:http://www.3gpp.org/ftp/tsg%5Fran/WG1%5FRL1/TSGR1%5FAH/NR%5FAH%5F1901/Docs/R1%2D1901048%2Ezip [retrieved on Jan. 11, 2019] Paragraph [0004]—Paragraph [0005].

Spreadtrum Communications: "Discussion on Physical Layer Procedures for Sidelink", 3GPP Draft, R1-1906362, 3GPP TSG RAN WG1 #97, Discussion on Physical Layer Procedures for Sidelink Final, 3rd Generation Partnership Project (3GPP), Mobile Competence Centre, 650, Route Des Lucioles, F-06921 Sophia-Antipo, vol. RAN WG1, no. Reno, USA, May 13, 2019-May 17, 2019, May 13, 2019 (May 13, 2019), XP051727812, 8 Pages, Retrieved from the Internet:URL:http://www.3gpp.org/ftp/Meetings%5F3GPP%5FSYNC/RAN1/Docs/R1%2D1906362%2Ezip [retrieved on May 13, 2019] Paragraph [02.3]—Paragraph [02.4].

Vivo: "Discussion on RLM in NR Sidelink", 3GPP Draft, R1-1904080, 3GPP TSG RAN WG1 Meeting #96bis, Discussion on RLM in NR Sidelink, 3rd Generation Partnership Project (3GPP), Mobile Competence Centre, 650, Route Des Lucioles, F-06921 Sophia-Antipolis Cedex, France, vol. RAN WG1, no. Xi 'an, China, Apr. 8, 20190-Apr. 12, 2019,Apr. 3, 2019 (Apr. 3, 2019), XP051707103, 3 Pages, Retrieved from the Internet:URL:http://www.3gpp.org/ftp/tsg%5Fran/WG1%5FRL1/TSGR1%5F96b/Docs/R1%2D1904080%2Ezip [retrieved on Apr. 3, 2019] the Whole Document.

* cited by examiner

SIDELINK POWER CONTROL

CROSS REFERENCE

The present Application for Patent claims the benefit of U.S. Provisional Patent Application No. 62/886,223 by FAKOORIAN et al., entitled "SIDELINK POWER CONTROL," filed Aug. 13, 2019, which is assigned to the assignee hereof and expressly incorporated by reference herein.

BACKGROUND

The following relates generally to wireless communications and more specifically to sidelink power control.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). Some wireless communications systems may support sidelink communications between two UEs (e.g., in addition to uplink and downlink communications between UEs and base stations).

SUMMARY

The described techniques relate to improved methods, systems, devices, and apparatuses that support sidelink power control. Generally, the described techniques provide for efficiently performing and reporting reference signal received power (RSRP) measurements. In particular, the techniques described herein may allow a user equipment (UE) to efficiently identify reference signals on which to perform RSRP measurements (e.g., based on signaling from a base station), identify when to report RSRP measurements (e.g., aperiodically, periodically, or semi-persistently), and identify a channel on which to report RSRP measurements (e.g., a sidelink channel or an uplink channel). In addition, the techniques described herein may also allow a UE to efficiently identify open loop parameters to use to determine an appropriate transmit power for transmitting to another UE over a sidelink.

A method of wireless communication at a first UE is described. The method may include receiving signaling indicating a set of one or more types of reference signals available for a reference signal received power measurement to support subsequent communication with a second UE over a sidelink, selecting, from the set, at least one type of reference signal to use for performing the reference signal received power measurement, receiving, over the sidelink, a reference signal of the at least one type from the second UE, performing the reference signal received power measurement on the received reference signal, and reporting the reference signal received power measurement.

An apparatus for wireless communication at a first UE is described. The apparatus may include a processor, memory coupled with the processor, and instructions stored in the memory. The instructions may be executable by the processor to cause the apparatus to receive signaling indicating a set of one or more types of reference signals available for a reference signal received power measurement to support subsequent communication with a second UE over a sidelink, select, from the set, at least one type of reference signal to use for performing the reference signal received power measurement, receive, over the sidelink, a reference signal of the at least one type from the second UE, perform the reference signal received power measurement on the received reference signal, and report the reference signal received power measurement.

Another apparatus for wireless communication at a first UE is described. The apparatus may include means for receiving signaling indicating a set of one or more types of reference signals available for a reference signal received power measurement to support subsequent communication with a second UE over a sidelink, selecting, from the set, at least one type of reference signal to use for performing the reference signal received power measurement, receiving, over the sidelink, a reference signal of the at least one type from the second UE, performing the reference signal received power measurement on the received reference signal, and reporting the reference signal received power measurement.

A non-transitory computer-readable medium storing code for wireless communication at a first UE is described. The code may include instructions executable by a processor to receive signaling indicating a set of one or more types of reference signals available for a reference signal received power measurement to support subsequent communication with a second UE over a sidelink, select, from the set, at least one type of reference signal to use for performing the reference signal received power measurement, receive, over the sidelink, a reference signal of the at least one type from the second UE, perform the reference signal received power measurement on the received reference signal, and report the reference signal received power measurement.

In some examples of the method, apparatuses, and non-transitory computer-readable medium described herein, selecting the at least one type of reference signal from the set to use for the reference signal received power measurement may include operations, features, means, or instructions for receiving control information indicating resources on which the reference signal of the at least one type may be to be received, and selecting the at least one type of reference signal for performing the reference signal received power measurement based on receiving the control information.

In some examples of the method, apparatuses, and non-transitory computer-readable medium described herein, the resources on which the reference signal of the at least one type may be to be received include aperiodic resources, semi-persistent resources, or periodic resources. In some examples of the method, apparatuses, and non-transitory computer-readable medium described herein, the control information includes downlink control information from a base station or sidelink control information from the second UE. In some examples of the method, apparatuses, and non-transitory computer-readable medium described herein, the set of one or more types of reference signals includes sounding reference signals (SRSs), demodulation reference signals (DMRSs), sidelink channel state information reference signals (SL-CSI-RSs), sidelink synchronization signal blocks (SL-SSBs), or any combination thereof.

Some examples of the method, apparatuses, and non-transitory computer-readable medium described herein may further include operations, features, means, or instructions for receiving control information indicating that the first UE may be to report the reference signal power measurement in response to the received reference signal, and reporting the reference signal received power measurement based on receiving the control information. In some examples of the method, apparatuses, and non-transitory computer-readable medium described herein, the control information includes DCI from a base station or sidelink control information (SCI) from the second UE. Some examples of the method, apparatuses, and non-transitory computer-readable medium described herein may further include operations, features, means, or instructions for determining that the signal to interference plus noise ratio of the received reference signal may be above a threshold or below a threshold, and reporting the reference signal received power measurement based on the determining.

Some examples of the method, apparatuses, and non-transitory computer-readable medium described herein may further include operations, features, means, or instructions for identifying a periodicity for reporting the reference signal received power measurements, and reporting the reference signal received power measurement based on the identified periodicity. Some examples of the method, apparatuses, and non-transitory computer-readable medium described herein may further include operations, features, means, or instructions for identifying a periodicity and a duration for reporting reference signal received power measurements, receiving control information activating reporting of reference signal received power measurements, and reporting the reference signal received power measurement based on the identified periodicity and duration.

Some examples of the method, apparatuses, and non-transitory computer-readable medium described herein may further include operations, features, means, or instructions for receiving control information indicating that the first UE may be to report the reference signal received power measurement on a PUSCH or a PUCCH, and reporting the reference signal received power measurement on the PUSCH or the PUCCH to a base station based on receiving the control information. In some examples of the method, apparatuses, and non-transitory computer-readable medium described herein, the control information includes DCI from a base station.

Some examples of the method, apparatuses, and non-transitory computer-readable medium described herein may further include operations, features, means, or instructions for receiving control information indicating that the first UE may be to report the reference signal received power measurement on a physical sidelink shared channel (PSSCH) or a physical sidelink feedback channel (PSFCH), and reporting the reference signal received power measurement on the PSSCH or the PSFCH to the second UE based on receiving the control information. In some examples of the method, apparatuses, and non-transitory computer-readable medium described herein, the control information includes sidelink control information (SCI) from the second UE.

Some examples of the method, apparatuses, and non-transitory computer-readable medium described herein may further include operations, features, means, or instructions for identifying, based on an indication in the signaling, a channel on which to report the reference signal received power measurement, and reporting the reference signal received power measurement on the channel. Some examples of the method, apparatuses, and non-transitory computer-readable medium described herein may further include operations, features, means, or instructions for determining that the first UE may be scheduled to report the reference signal received power measurement and to transmit uplink data or uplink control information (UCI) to a base station in a same time interval, and reporting the reference signal received power measurements on a physical sidelink shared channel (PSSCH) or a physical sidelink feedback channel (PSFCH) to the second UE based on the determining.

In some examples of the method, apparatuses, and non-transitory computer-readable medium described herein, the signaling configures a first group of open loop parameter sets available for the first UE to use to calculate a transmit power for transmissions to a base station on an uplink, and where the signaling configures a second group of open loop parameter sets available for the first UE to use to calculate a transmit power for transmissions to the second UE on the sidelink. Some examples of the method, apparatuses, and non-transitory computer-readable medium described herein may further include operations, features, means, or instructions for receiving control information indicating an open loop parameter set in the first group for the first UE to use to calculate the transmit power for reporting the reference signal received power measurement to the base station on the uplink and receiving control information indicating an open loop parameter set in the second group for the first UE to use to calculate the transmit power for reporting the reference signal received power measurements to the second UE on the sidelink.

Some examples of the method, apparatuses, and non-transitory computer-readable medium described herein may further include operations, features, means, or instructions for receiving an indication of a transmit power used by the second UE to transmit the reference signal, determining a pathloss associated with the sidelink based on the transmit power used by the second UE to transmit the reference signal and the reference signal received power measurement, and determining a transmit power for reporting the reference signal received power measurement based on the pathloss, where the reporting may be to the second UE. Some examples of the method, apparatuses, and non-transitory computer-readable medium described herein may further include operations, features, means, or instructions for receiving, from the second UE, an indication of an open loop parameter set for determining the transmit power for reporting the reference signal received power measurement, and determining a transmit power for reporting the reference signal received power measurement based on the open loop parameter set.

Some examples of the method, apparatuses, and non-transitory computer-readable medium described herein may further include operations, features, means, or instructions for receiving a TPC indicating a transmit power for reporting the reference signal received power measurement, and determining the transmit power for reporting the reference signal received power measurement based on the TPC. In some examples of the method, apparatuses, and non-transitory computer-readable medium described herein, the signaling indicating the set of one or more types of reference signals available for performing the reference signal received power measurement may be higher layer signaling.

A method of wireless communication at a second UE is described. The method may include identifying at least one type of reference signal from a set of one or more types of reference signals to transmit to a first UE over a sidelink, where the at least one type of reference signal is to support a reference signal received power measurement by the first UE, transmitting, to the first UE over the sidelink, control information indicating resources on which a reference signal of the at least one type is to be transmitted to the first UE, and transmitting, to the first UE over the sidelink, the reference signal of the at least one type on the indicated resources.

An apparatus for wireless communication at a first UE is described. The apparatus may include a processor, memory coupled with the processor, and instructions stored in the memory. The instructions may be executable by the processor to cause the apparatus to identify at least one type of reference signal from a set of one or more types of reference signals to transmit to a first UE over a sidelink, where the at least one type of reference signal is to support a reference signal received power measurement by the first UE, transmit, to the second UE over the sidelink, control information indicating resources on which a reference signal of the at least one type is to be transmitted to the first UE, and transmit, to the first UE over the sidelink, the reference signal of the at least one type on the indicated resources.

Another apparatus for wireless communication at a second UE is described. The apparatus may include means for identifying at least one type of reference signal from a set of one or more types of reference signals to transmit to a first UE over a sidelink, where the at least one type of reference signal is to support a reference signal received power measurement by the first UE, transmitting, to the first UE over the sidelink, control information indicating resources on which a reference signal of the at least one type is to be transmitted to the first UE, and transmitting, to the first UE over the sidelink, the reference signal of the at least one type on the indicated resources.

A non-transitory computer-readable medium storing code for wireless communication at a second UE is described. The code may include instructions executable by a processor to identify at least one type of reference signal from a set of one or more types of reference signals to transmit to a first UE over a sidelink, where the at least one type of reference signal is to support a reference signal received power measurement by the first UE, transmit, to the first UE over the sidelink, control information indicating resources on which a reference signal of the at least one type is to be transmitted to the first UE, and transmit, to the first UE over the sidelink, the reference signal of the at least one type on the indicated resources.

Some examples of the method, apparatuses, and non-transitory computer-readable medium described herein may further include operations, features, means, or instructions for receiving a reference signal received power measurement from the first UE, the reference signal received power measurement being based on the reference signal. Some examples of the method, apparatuses, and non-transitory computer-readable medium described herein may further include operations, features, means, or instructions for forwarding the reference signal received power measurement to a base station. Some examples of the method, apparatuses, and non-transitory computer-readable medium described herein may further include operations, features, means, or instructions for determining a transmit power for a subsequent transmission to the first UE over the sidelink based on the reference signal received power measurement.

In some examples of the method, apparatuses, and non-transitory computer-readable medium described herein, the control information further indicates that the first UE may be to report the reference signal received power measurement based on the transmitted reference signal. In some examples of the method, apparatuses, and non-transitory computer-readable medium described herein, the control information further indicates that the first UE may be to report the reference signal received power measurement on a PUSCH, a PUCCH, a physical sidelink shared channel (PSSCH), or a physical sidelink feedback channel (PSFCH). Some examples of the method, apparatuses, and non-transitory computer-readable medium described herein may further include operations, features, means, or instructions for transmitting, to the first UE over the sidelink, signaling indicating the set of one or more types of reference signals, where the set of one or more types of reference signals corresponds to types of reference signals available for reference signal received power measurements by the first UE.

In some examples of the method, apparatuses, and non-transitory computer-readable medium described herein, the signaling configures a first group of open loop parameter sets for the first UE to use to calculate a transmit power for transmissions to a base station on an uplink, and where the signaling configures a second group of open loop parameter sets for the first UE to use to calculate a transmit power for transmissions to the second UE on the sidelink. Some examples of the method, apparatuses, and non-transitory computer-readable medium described herein may further include operations, features, means, or instructions for transmitting, to the first UE over the sidelink, an indication of an open loop parameter set in the first group for the first UE to use to calculate a transmit power for reporting the reference signal received power measurements to the base station on the uplink and transmitting, to the first UE over the sidelink, an indication of an open loop parameter set in the second group for the first UE to use to calculate a transmit power for reporting the reference signal received power measurements to the second UE on the sidelink.

In some examples of the method, apparatuses, and non-transitory computer-readable medium described herein, the signaling indicating the set of one or more types of reference signals available for performing the reference signal received power measurement may be higher layer signaling. Some examples of the method, apparatuses, and non-transitory computer-readable medium described herein may further include operations, features, means, or instructions for transmitting, to the first UE over the sidelink, an indication of a transmit power used to transmit the reference signal.

Some examples of the method, apparatuses, and non-transitory computer-readable medium described herein may further include operations, features, means, or instructions for receiving, from the first UE over the sidelink, an indication of an open loop parameter set for determining a transmit power for transmitting the reference signal, and determining the transmit power for transmitting the reference signal based on the open loop parameter set. Some examples of the method, apparatuses, and non-transitory computer-readable medium described herein may further include operations, features, means, or instructions for receiving a TPC indicating a transmit power for transmitting the reference signal, and determining the transmit power for transmitting the reference signal based on the TPC.

A method of wireless communication at a base station is described. The method may include identifying a first UE in communications with a second UE over a sidelink, identifying at least one type of reference signal from a set of one or more types of reference signals for the second UE to transmit to the first UE, where the at least one type of reference signal is to be used by the first UE for performing a reference signal received power measurement, and transmitting, to the first UE and the second UE, control information indicating resources on which a reference signal of the at least one type is to be transmitted by the second UE to the first UE.

An apparatus for wireless communication at a base station is described. The apparatus may include a processor, memory coupled with the processor, and instructions stored in the memory. The instructions may be executable by the processor to cause the apparatus to identify a first UE in communications with a second UE over a sidelink, identify at least one type of reference signal from a set of one or more types of reference signals for the second UE to transmit to the first UE, where the at least one type of reference signal is to be used by the first UE for performing a reference signal received power measurement, and transmit, to the first UE and the second UE, control information indicating resources on which a reference signal of the at least one type is to be transmitted by the second UE to the first UE.

Another apparatus for wireless communication at a base station is described. The apparatus may include means for identifying a first UE in communications with a second UE over a sidelink, identifying at least one type of reference signal from a set of one or more types of reference signals for the second UE to transmit to the first UE, where the at least one type of reference signal is to be used by the first UE for performing a reference signal received power measurement, and transmitting, to the first UE and the second UE, control information indicating resources on which a reference signal of the at least one type is to be transmitted by the second UE to the first UE.

A non-transitory computer-readable medium storing code for wireless communication at a base station is described. The code may include instructions executable by a processor to identify a first UE in communications with a second UE over a sidelink, identify at least one type of reference signal from a set of one or more types of reference signals for the second UE to transmit to the first UE, where the at least one type of reference signal is to be used by the first UE for performing a reference signal received power measurement, and transmit, to the first UE and the second UE, control information indicating resources on which a reference signal of the at least one type is to be transmitted by the second UE to the first UE.

Some examples of the method, apparatuses, and non-transitory computer-readable medium described herein may further include operations, features, means, or instructions for receiving, from the first UE or from the second UE, a reference signal received power measurement performed by the first UE. Some examples of the method, apparatuses, and non-transitory computer-readable medium described herein may further include operations, features, means, or instructions for determining a transmit power for the second UE to use for a subsequent transmission to the first UE over the sidelink based on the reference signal received power measurement, and transmitting a TPC indicating the transmit power for the second UE to use for the subsequent transmission to the first UE.

In some examples of the method, apparatuses, and non-transitory computer-readable medium described herein, the control information further indicates that the first UE may be to report the reference signal received power measurement in response to the reference signal. In some examples of the method, apparatuses, and non-transitory computer-readable medium described herein, the control information further indicates that the first UE may be to report the reference signal received power measurement on a PUSCH, a PUCCH, a physical sidelink shared channel (PSSCH), or a physical sidelink feedback channel (PSFCH).

Some examples of the method, apparatuses, and non-transitory computer-readable medium described herein may further include operations, features, means, or instructions for transmitting signaling indicating the set of one or more types of reference signals, where the set of one or more types of reference signals corresponds to types of reference signals available for reference signal received power measurements by the first UE. In some examples of the method, apparatuses, and non-transitory computer-readable medium described herein, the signaling configures a first group of open loop parameter sets for the first UE or the second UE to use to calculate a transmit power for transmissions to the base station on an uplink, and where the signaling configures a second group of open loop parameter sets for the first UE or the second UE to use to calculate a transmit power for transmissions over the sidelink.

Some examples of the method, apparatuses, and non-transitory computer-readable medium described herein may further include operations, features, means, or instructions for transmitting an indication of an open loop parameter set in the first group for the first UE to use to calculate the transmit power for reporting the reference signal received power measurements to the base station on the uplink and transmitting an indication of open loop parameters in the second set for the first UE to use to calculate the transmit power for reporting the reference signal received power measurements to the second UE on the sidelink. In some examples of the method, apparatuses, and non-transitory computer-readable medium described herein, the signaling indicating the set of one or more types of reference signals available for reference signal received power measurements by the first UE may be higher layer signaling.

DETAILED DESCRIPTION

Some wireless communications systems may support sidelink communications between user equipment (UEs) (e.g., in addition to uplink and downlink communications between UEs and base stations). In some cases, a first UE may be scheduled (e.g., by a base station or another UE) to transmit data or control information to a second UE over a sidelink. In such cases, if the power used by the first UE to transmit over the sidelink is too high, the sidelink transmission may interfere with other communications in a wireless communications system. Alternatively, if the power used by the first UE is too low, the second UE may not be able to correctly receive and decode the sidelink transmission. Accordingly, the first UE may support techniques for sidelink power control such that the first UE may be able to determine a suitable power for transmitting to the second UE over the sidelink.

A UE may use open loop parameters and a measured pathloss to determine a transmit power for sidelink and uplink transmissions. However, the techniques used for uplink power control may not be applied to sidelink power control. For example, in some cases, it may not be appropriate for the same reference signals to be used by the UE to determine a pathloss associated with an uplink channel and a pathloss associated with a sidelink channel for uplink and sidelink power control. In addition, it may not be appropriate for a UE to use the same procedure for reporting measurements for sidelink power control and uplink power control.

As described herein, a sidelink UE in a wireless communications system may support efficient techniques for sidelink power control. In particular, a sidelink UE may support efficient techniques for performing and reporting reference signal received power (RSRP) measurements to be used by another UE or a base station to determine a pathloss for use in calculating a transmit power for sidelink transmissions. The techniques described herein may allow a UE to efficiently identify reference signals on which to perform RSRP measurements (e.g., based on signaling from a base station), identify when to report RSRP measurements (e.g., aperiodically, periodically, or semi-persistently), and identify a channel on which to report RSRP measurements (e.g., a sidelink channel or an uplink channel). In addition, the techniques described herein may also allow a UE to identify open loop parameters to use when determining an appropriate transmit power for performing sidelink transmissions to another UE.

Aspects of the disclosure introduced above are described below in the context of a wireless communications system. Examples of processes and signaling exchanges that support sidelink power control are then described. Aspects of the disclosure are further illustrated by and described with reference to apparatus diagrams, system diagrams, and flowcharts that relate to sidelink power control.

Figure 1:
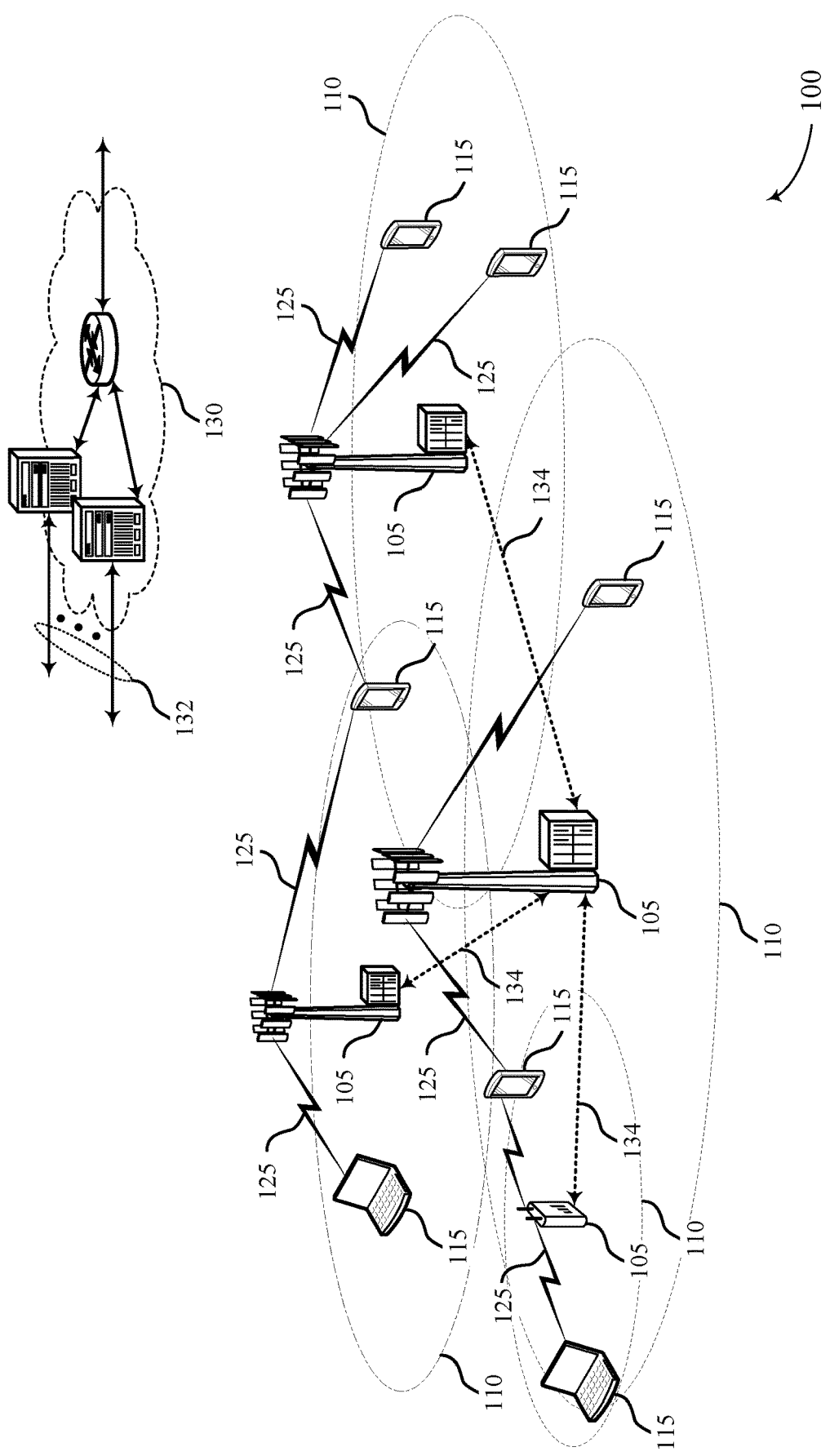
FIGS. 1 and 2 illustrate examples of wireless communications systems that support sidelink power control in accordance with aspects of the present disclosure.

FIG. 1 illustrates an example of a wireless communications system 100 that supports sidelink power control in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 over a sidelink connection (e.g., using a peer-to-peer (P2P) or device-to-device (D2D) protocol). Such communications may be referred to as D2D or sidelink communications. One or more of a group of UEs 115 utilizing D2D communications may be within the geographic coverage area 110 of a base station 105. In some cases, other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group.

In some cases, a base station 105 facilitates the scheduling of resources for D2D communications. In other cases, D2D communications are carried out between UEs 115 without the involvement of a base station 105. In one example, sidelink communications may include discovery expression transmissions on a physical sidelink discovery channel (PSDCH) (e.g., to allow proximal devices to discover each other's presence). In another example, sidelink communications may include control information transmissions on a physical sidelink control channel (PSCCH). In yet another example, sidelink communications may include data transmissions on a physical sidelink shared channel (PSSCH). In yet another example, sidelink communications may include feedback transmissions on a physical sidelink feedback channel (PSFCH).

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

As described above, wireless communications system 100 may support sidelink communications between UEs 115 (e.g., in addition to uplink and downlink communications between UEs 115 and base stations 105). In some cases, a first UE 115 may be scheduled (e.g., by a base station 105 or another UE 115) to transmit data or control information to a second UE 115 over a sidelink. In such cases, if the power used by the first UE 115 to transmit over the sidelink is too high, the sidelink transmission may interfere with other communications in wireless communications system 100. Alternatively, if the power used by the first UE 115 is too low, the second UE 115 may not be able to correctly receive and decode the sidelink transmission. Accordingly, the first UE 115 may support techniques for sidelink power control such that the first UE 115 may be able to determine a suitable power for transmitting to the second UE 115 over a sidelink. Sidelink power control may include the transmission of reference signals and the reporting of feedback used to determine a transmit power for sidelink transmissions.

In some cases, a wireless communications system may support at least sidelink channel state information reference signals (CSI-RSs) for channel quality indication (CQI) or rank indication (RI) measurements (e.g., where sidelink CSI-RS is confined within the PSSCH transmission). In some examples (e.g., in LTE systems), for unicast, groupcast, or broadcast sidelink communications, sidelink power control (e.g., open-loop power control) may be based on the pathloss between the transmit UE 115 and the base station 105 (e.g., to mitigate interference to uplink reception at the base station 105 if the transmit UE 115 is in coverage). In other examples, the sidelink power control may be based on the pathloss between the transmit UE and receive UE. In such examples, sidelink RSRP may be reported by a receive UE to a transmit UE, and the transmit UE may derive the pathloss estimation.

Further, for sidelink power control, a UE 115 may be configured to use downlink pathloss only (i.e., between a transmit UE 115 and a base station 105), sidelink pathloss only (i.e., between a transmit UE 115 and a receive UE 115), or both downlink pathloss and sidelink pathloss. When a transmit UE is configured to use both downlink pathloss and sidelink pathloss for sidelink power control, the minimum of the power values given by open-loop power control based on the downlink pathloss and open-loop power control based on the sidelink pathloss is used. In particular, the downlink pathloss and the sidelink pathloss may be used with open loop parameters in different equations to determine a transmit power, and the minimum transmit power may be used for a sidelink transmission. In some cases, the open loop parameters (P0 and alpha) may be preconfigured for downlink pathloss and sidelink pathloss (e.g., preconfigured together or separately).

In some cases, a UE 115 may use open loop parameters and a measured pathloss to determine a transmit power for sidelink and uplink transmissions. However, the same techniques used for uplink power control may not be applied to sidelink power control. For example, in some cases, it may not be appropriate for the same reference signals to be used by the UE to determine the pathloss for uplink power control and sidelink power control. In addition, it may not be appropriate for a UE to use the same procedure for reporting measurements (e.g., RSRP measurements) used to determine the pathloss for sidelink power control and uplink power control. UEs 115 in wireless communications system 100 may support efficient techniques for sidelink power control.

Figure 2:
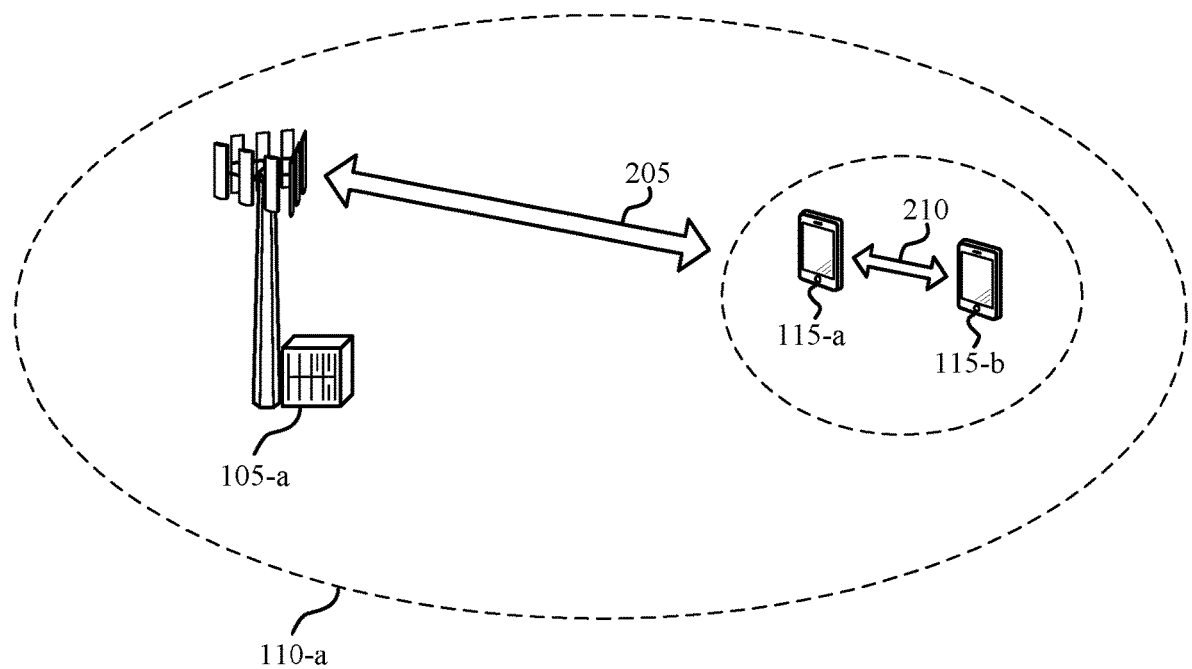

FIG. 2 illustrates an example of a wireless communications system 200 that supports sidelink power control in accordance with aspects of the present disclosure. Wireless communications system 200 includes base station 105-a, which may be an example of a base station 105 described with reference to FIG. 1. Wireless communications system 200 also includes UE 115-a and UE 115-b, which may be examples of a UE 115 described with reference to FIG. 1. UE 115-a and UE 115-b may communicate with each other over a sidelink and may be referred to as sidelink UEs 115 (e.g., where UE 115-a may be a transmit UE and UE 115-b may be a receive UE). FIG. 2 illustrates an example in which sidelink UE 115-a and sidelink UE 115-b are both within the coverage area 110-a of base station 105-a, but it is to be understood that aspects of the techniques described herein may also be used when only one of sidelink UE 115-a and sidelink UE 115-b is within the coverage area 110-a of base station 105-a as well as when neither sidelink UE 115-a nor sidelink UE 115-b is within the coverage area 110-a of base station 105-a.

Wireless communications system 200 may implement aspects of wireless communications system 100. For example, UEs 115 in wireless communications system 200 may support efficient techniques for sidelink power control. In particular, UE 115-b may support efficient techniques for performing and reporting RSRP measurements to be used by UE 115-a or base station 105-a to determine a pathloss for calculating a transmit power for sidelink transmissions.

In the example of FIG. 2, sidelink UEs 115-a and 115-b may be configured to perform sidelink power control prior to a sidelink transmission to determine a suitable transmit power for the sidelink transmission. As part of the sidelink power control procedure, sidelink UE 115-a may transmit reference signals to sidelink UE 115-b for RSRP measurements. Sidelink UE 115-b may receive the reference signals, perform the RSRP measurements, and report the RSRP measurements to sidelink UE 115-a. Sidelink UE 115-a may then determine a pathloss between sidelink UE 115-a and sidelink UE 115-b. Sidelink UE 115-a may use the pathloss to determine a transmit power for subsequent sidelink transmissions to UE 115-b.

Base station 105-a may transmit signaling (e.g., higher layer signaling, such as RRC signaling) indicating a set of one or more types of reference signals available (or usable) for sidelink UE 115-a to transmit and for sidelink UE 115-b to use to perform RSRP measurements. The signaling may also indicate whether each type of reference signal may be transmitted aperiodically, periodically, or semi-persistently. In some cases, base station 105-a may transmit the signaling to UE 115-a, and UE 115-a may forward the indication of the set of one or more types of reference signals to UE 115-b. Alternatively, UE 115-a may independently identify the set of one or more types of reference signals and transmit the signaling to UE 115-b (e.g., without receiving the signaling from base station 105-a). The set of one or more types of reference signals may include sounding reference signals (SRSs), demodulation reference signals (DMRSs), sidelink channel state information reference signals (SL-CSI-RSs), or sidelink synchronization signal blocks (SL-SSBs). If DMRSs are used, the DMRSs may be transmitted with data or control information (e.g., if control information is transmitted by sidelink UE 115-a). If SL-SSBs are used, it may be appropriate for sidelink UE 115-a to indicate to sidelink UE 115-b that the SL-SSBs are transmitted by the sidelink UE 115-a.

Base station 105-a may then transmit downlink control information (DCI) to sidelink UE 115-a and sidelink UE 115-b indicating which types of reference signals from the set (e.g., CSI-RS and DMRS) are to be used for RSRP measurements (e.g., all or a subset of the set of one or more types of reference signals). Alternatively, base station 105-a may transmit the DCI to sidelink UE 115-a, and sidelink UE 115-a may transmit sidelink control information (SCI) to sidelink UE 115-b indicating which types of reference signals from the set are to be used for RSRP measurements. For aperiodic reference signal configuration, DCI or SCI may indicate which reference signal is activated. In some cases, the indication to sidelink UE 115-b of which types of reference signals from the set are to be used for RSRP measurements may be an indication of resources for sidelink UE 115-b to monitor for reference signals from sidelink UE 115-a (e.g., where the resources may be aperiodic, periodic, or semi-persistent). In some examples, the DCI or SCI may not include signaling indicating the set of one or more types of reference signals available for RSRP measurements but may indicate which types of references signals the sidelink UEs 115- and 115-b are to use for RSRP measurements.

Once sidelink UE 115-b is able to identify and receive the reference signals from sidelink UE 115-a, sidelink UE 115-b may perform RSRP measurements on the reference signals. Sidelink UE 115-b may then report the RSRP measurements to sidelink UE 115-a or to base station 105-a. In some cases, sidelink UE 115-b may be configured to report RSRP measurements aperiodically. In such cases, the DCI or SCI may trigger the transmission of the RSRP report. That is, the DCI or SCI may indicate that sidelink UE 115-b is to measure sidelink RSRP over the indicated reference signal symbols transmitted by sidelink UE 115-a. As an example, the DCI or SCI may indicate that sidelink UE 115-b is to measure sidelink RSRP over reference signals from sidelink UE 115-a from n1 symbols after the PDCCH triggering the sidelink RSRP measurements until n2 symbols before the start of a reporting channel used to transmit the RSRP report. In some examples, rather than being triggered by DCI or SCI, an aperiodic RSRP report may be triggered based on a soft acknowledgement/negative acknowledgement (ACK/NACK). For example, if the signal-to-interference-plus-noise ratio (SINR) of the received reference signals is above a first threshold ($\gamma_1$) or below a second threshold ($\gamma_2$), sidelink UE 115-a may report RSRP measurements. In some examples, sidelink UE 115-b may be configured to report RSRP measurements periodically or semi-persistently (e.g., for industrial internet of things (IIOT) applications where the traffic nature is deterministic and periodic).

The RSRP report generated by sidelink UE 115-b may be transmitted to sidelink UE 115-a over a sidelink on a PSSCH or PSFCH or to base station 105-a over an uplink on a PUCCH or a PUSCH (e.g., if the sidelink UE 115-b is in the coverage area of base station 105-a). In some cases, if the DCI or SCI used to schedule the PUCCH or PUSCH indicates that the RSRP report is to be multiplexed with the PUCCH or PUSCH, sidelink UE 115-b may transmit the RSRP report on the PUCCH or PUSCH. In such cases, the base station 105-a may schedule and configure sidelink communications between sidelink UE 115-a and sidelink UE 115-b and may determine the transmit power for sidelink UE 115-a to use for sidelink transmissions (e.g., mode one scheduling). In other cases, if the DCI or SCI used to schedule the PSSCH or PSFCH indicates that the RSRP report is to be multiplexed with the PSSCH or PSFCH, sidelink UE 115-b may transmit the RSRP report on the PSSCH or PSFCH. In such cases, the sidelink UE 115-a may schedule and configure sidelink communications with UE 115-b and may determine the transmit power for sidelink transmissions to sidelink UE 115-b. (e.g., mode two scheduling, where the transmit UE has at least some scheduling decision authority or for partial coverage where the receive UE is not in the coverage area of the base station).

If sidelink UE 115-b is outside the coverage area of base station 105-a, sidelink UE 115-b may trigger the RSRP report from sidelink UE 115-b. In this case, for mode one scheduling, where base station 105-a performs the scheduling of sidelink communications, the RSRP report is transmitted by the sidelink UE 115-b to sidelink UE 115-a, and sidelink UE 115-a may forward the RSRP report to base station 105-a on a PUCCH or PUSCH (e.g., as indicated by DCI). In some cases, the signaling (e.g., higher layer signaling) described above that is transmitted by base station 105-a or UE 115-a to UE 115-b may indicate the channel (or resource) for sidelink UE 115-b to use to transmit RSRP reports, and sidelink UE 115-b may transmit the RSRP report on the indicated channel. Such signaling may be used to indicate the channel for sidelink UE 115-b to use to transmit RSRP reports in the case that a soft ACK/NACK triggers the RSRP report or in the case that RSRP reports are transmitted periodically.

In some examples, such signaling may not be used to indicate the channel for aperiodic RSRP reporting, since the channel or resource may be reserved and the sidelink UE 115-a may have to perform blind detection to receive the RSRP report even when the RSRP report is not transmitted by sidelink UE. If sidelink UE 115-b is configured for carrier aggregation or supports multiple simultaneous uplink or sidelink transmissions, and sidelink UE 115-b is scheduled for an uplink transmission at the same time as an RSRP report transmission, sidelink UE 115-b may transmit (or multiplex) the RSRP report on sidelink channels (e.g., PSSCH or PSFCH, rather than PUCCH or PUSCH). Sidelink UE 115-a may then forward the RSRP report to base station 105-a, if appropriate, based on scheduling and coverage modes (e.g., mode one or more two), or if the sidelink UE 115-a is closer to base station 105-a than sidelink UE 115-b.

Figure 3:
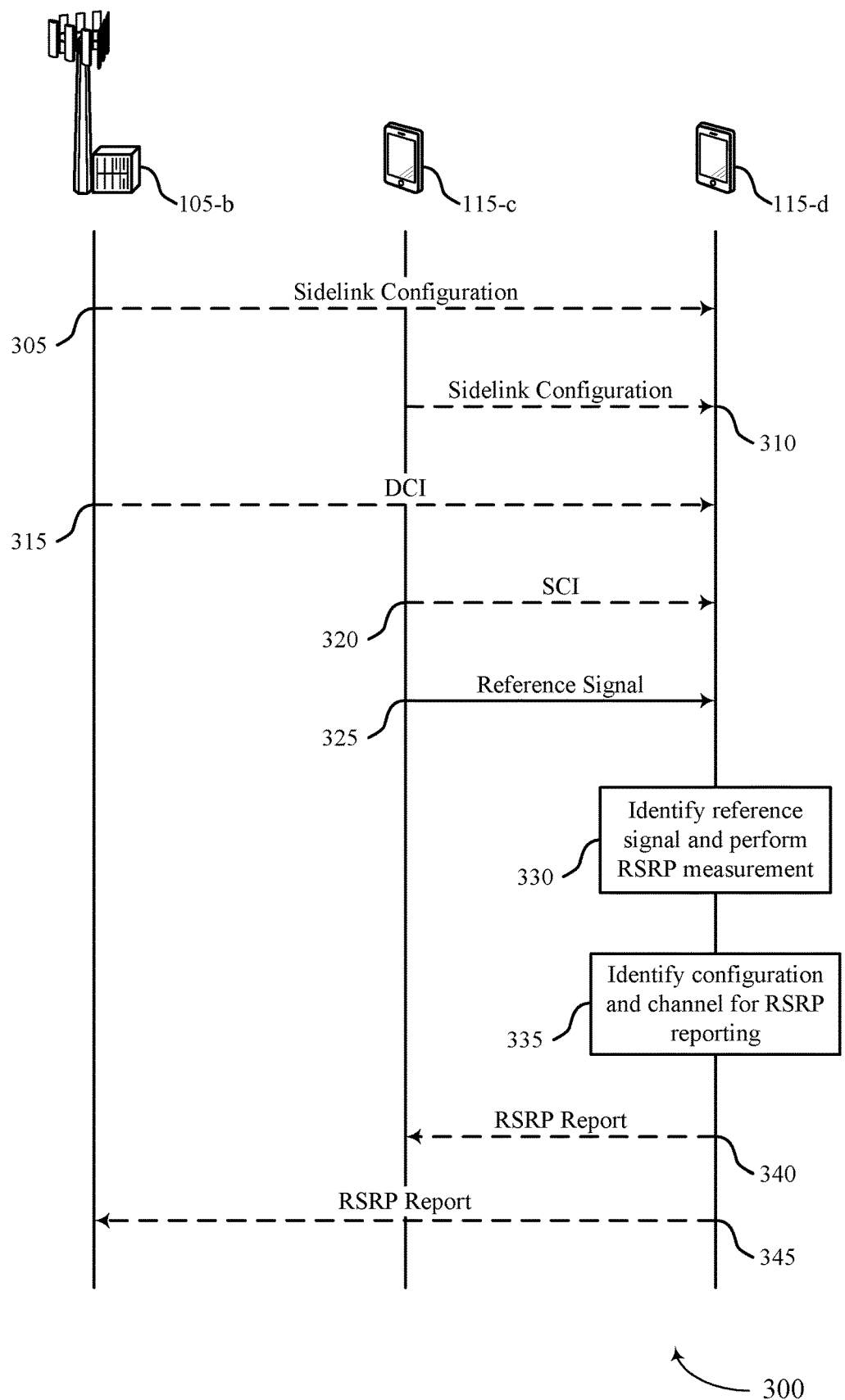
FIGS. 3 and 4 illustrate examples of process flows that support sidelink power control in accordance with aspects of the present disclosure.

FIG. 3 illustrates an example of a process flow 300 that supports sidelink power control in accordance with aspects of the present disclosure. Process flow 300 illustrates aspects of techniques performed by a base station 105-b, which may be an example of a base station 105 described with reference to FIGS. 1 and 2. Process flow 300 also illustrates aspects of techniques performed by a UE 115-c and a UE 115-d, which may be examples of a UE 115 described with reference to FIGS. 1 and 2. In the example of FIG. 3, UE 115-c may communicate with UE 115-d over a sidelink.

At 305, a base station 105-b may transmit a sidelink configuration to UE 115-d indicating a set of one or more types of reference signals available for an RSRP measurement used to support subsequent communication between UE 115-c and UE 115-d over a sidelink. Alternatively, UE 115-c may transmit the sidelink configuration indicating the set of one or more types of reference signals to UE 115-d over the sidelink (e.g., after receiving the sidelink configuration from base station 105-b). The sidelink configuration may be transmitted in higher layer signaling (e.g., RRC signaling), and the set of one or more types of reference signals may include SRSs, DMRSs, SL-CSI-RSs, or SL-SSBs.

At 315, base station 105-b may transmit DCI to UE 115-d indicating at least one type of reference signal to use for performing the RSRP measurement. Additionally or alternatively, at 320, UE 115-c may transmit SCI to UE 115-d indicating the at least one type of reference signal to use for performing the RSRP measurement. UE 115-d may then select the at least one type of reference signal (e.g., from the set of one or more types of reference signals configured by the sidelink configuration) to use for performing the RSRP measurement based on receiving the DCI or SCI. Alternatively, UE 115-d may select the at least one type of reference signal to use for performing the RSRP measurement independent of signaling from base station 105-b or UE 115-c (e.g., based on a configuration at the UE 115-d).

At 325, UE 115-c may transmit a reference signal, over the sidelink, to UE 115-d, and, at 330, UE 115-d may identify and receive the reference signal (e.g., based on the DCI or SCI). UE 115-d may then perform the RSRP measurement on the received reference signal. At 335, UE 115-d may identify a configuration (e.g., aperiodic, periodic, or semi-persistent configuration) and channel for RSRP reporting. At 340, UE 115-d may transmit an RSRP report with the RSRP measurement to UE 115-c over a sidelink based on the identified configuration and channel (e.g., where UE 115-c may forward the RSRP report to base station 105-b if sidelink communications are scheduled by the base station 105-b). Alternatively, at 345, UE 115-d may transmit the RSRP report with the RSRP measurement to base station 105-b based on the identified configuration and channel.

In some cases, UE 115-d may be configured to report RSRP measurements aperiodically, and UE 115-d may report the RSRP measurement in an aperiodic transmission. Specifically, the DCI or SCI may indicate that UE 115-d is to report the RSRP measurement in response to the received reference signal (i.e., the DCI or SCI may trigger reporting of the RSRP measurement), and UE 115-d may transmit the RSRP report based on receiving the DCI or SCI. In other cases, UE 115-d may be configured to report RSRP measurements periodically, and UE 115-d may identify a periodicity for reporting the RSRP measurement. UE 115-d may then report the RSRP measurement based on the periodicity (e.g., on periodic resources). In yet other cases, UE 115-d may be configured to report RSRP measurements semi-persistently, and UE 115-d may identify a periodicity and a duration for reporting RSRP measurements. UE 115-d may then report the RSRP measurement based on the periodicity and for the identified duration (e.g., on semi-persistent resources). In such cases, the DCI or SCI may trigger the semi-persistent RSRP reporting.

In some cases, the DCI or SCI may indicate that the UE 115-d is to report the RSRP measurement on a PUSCH or a PUCCH, and UE 115-d may report the RSRP measurement on the PUSCH or the PUCCH to base station 105-b. In other cases, the DCI or SCI may indicate that the UE 115-d is to report the RSRP measurement on a PSSCH or a PSFCH, and UE 115-d may report the RSRP measurement on the PSSCH or the PSFCH to UE 115-c. In yet other cases, the sidelink configuration at 305 or 310 may indicate a channel on which the UE 115-d is to report the RSRP measurement, and UE 115-d may report the RSRP measurement on the indicated channel. In yet other cases, if UE 115-d determines that the RSRP measurement is scheduled to be reported in a same time interval as an uplink data or control transmission in a PUCCH or PUSCH, UE 115-d may report the RSRP measurement on the PSSCH or the PSFCH to UE 115-c.

Figure 4:
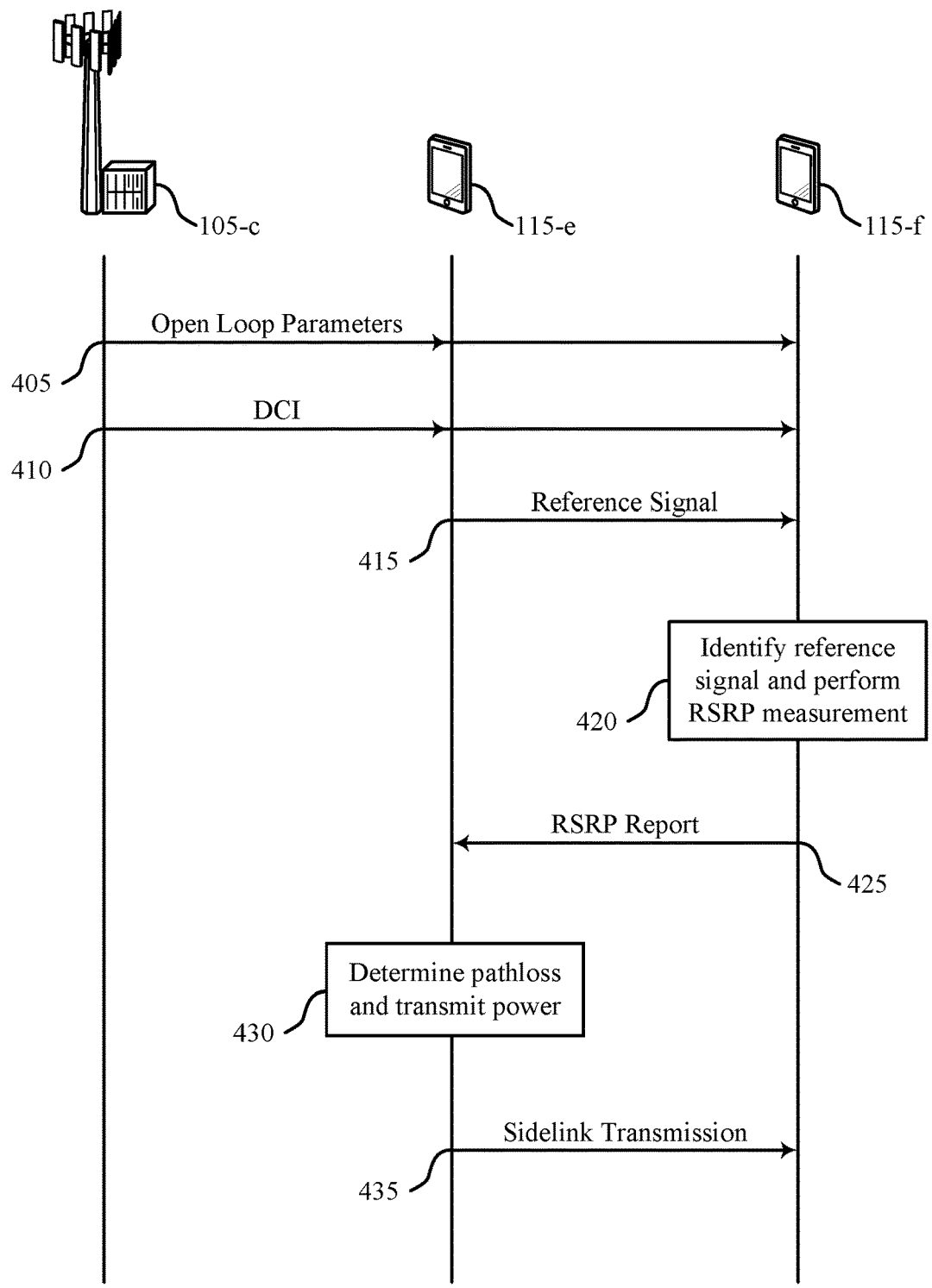

FIG. 4 illustrates an example of a process flow 400 that supports sidelink power control in accordance with aspects of the present disclosure. Process flow 400 illustrates aspects of techniques performed by a base station 105-c, which may be an example of a base station 105 described with reference to FIGS. 1-3. Process flow 400 also illustrates aspects of techniques performed by a UE 115-e and a UE 115-f, which may be examples of a UE 115 described with reference to FIGS. 1-3. In the example of FIG. 4, UE 115-e may communicate with UE 115-f over a sidelink.

At 405, base station 105-c may transmit an indication of a first group of open loop parameter sets available for UE 115-e and UE 115-f to calculate a transmit power for uplink transmissions to base station 105-c and a second group of open loop parameter sets available for UE 115-e and UE 115-f to calculate a transmit power for sidelink transmissions to each other. The indication of the first and second groups of open loop parameters may be transmitted in RRC signaling. An open loop parameter set in the first group and a corresponding open loop parameter set in the second group (e.g., corresponding to the same index) may correspond to pairs of P0 and alpha ($\alpha$) values for a UE 115 to use to calculate transmit powers for uplink transmissions and sidelink transmissions respectively (e.g., $\{P0_{gNB}, P0_{SL}\}$ and $\{\alpha_{gNB}, \alpha_{SL}\}$ or $\{P0_{gNB}, \alpha_{gNB}\}$ and $\{P0_{SL}, \alpha_{SL}\}$). In some cases, the indication of the first and second groups of open loop parameters may be transmitted to UE 115-e and forwarded by UE 115-e to UE 115-f (e.g., if UE 115-f is not in the coverage area of base station 105-c).

At 410, base station 105-c may then transmit DCI indicating an open loop parameter set in the first group for UE 115-e and UE 115-f to use to calculate a transmit power for transmissions to base station 105-c on the uplink or an open loop parameter set in the second group for UE 115-e and UE 115-f to use to calculate a transmit power for transmissions on the sidelink. Specifically, the DCI may include an SRS resource indicator (SRI) that indicates which pair of open loop parameter sets to use. If an SRI is not configured or not included in the DCI (e.g., for DCI format 0_0), the first pair in the configuration may be used (i.e., the first pair of open loop parameter sets $\{P0_{gNB}, \alpha_{gNB}\}$ and $\{P0_{SL}, \alpha_{SL}\}$ in the first and second groups). In some cases, the same open loop parameter set (e.g., P0 and alpha values) may be used by sidelink UE 115-e and UE 115-f (i.e., both UEs) for sidelink communications. In other cases, different open loop parameter sets may be used by sidelink UE 115-e and UE 115-f for sidelink communications. For instance, the open loop parameter set used by UE 115-e may be based on whether UE 115-e is transmitting data or control information. For instance, the transmit power used to transmit sidelink data may be greater than the transmit power used to transmit control information (e.g., $P0_{SL,PSSCH}=P0_{SL,PSCCH}+\Delta$, where $\Delta$ is RRC configured (e.g., $\Delta=3$ dB)).

At 415, UE 115-e may transmit a reference signal to UE 115-f, and, at 420, UE 115-f may identify the reference signal and perform an RSRP measurement on the reference signal. At 425, UE 115-f may then transmit an RSRP report to UE 115-e. In some cases, UE 115-f may determine the transmit power to use to transmit the RSRP report based on a pathloss between UE 115-e and UE 115-f and the open loop parameter set indicated at 410. In such cases, UE 115-f may receive an indication of the transmit power used by UE 115-e to transmit the reference signal, and UE 115-f may calculate the pathloss based on the transmit power and the RSRP measurement (e.g., the pathloss may be equal to the difference between the transmit power and the RSRP measurement). UE 115-*e* may receive the RSRP report, and, at 430, UE 115-*e* may determine a pathloss based on the transmit power used to transmit the reference signal and the RSRP indicated in the RSRP report (e.g., the pathloss may be equal to the difference between the transmit power and the RSRP indicated in the RSRP report). UE 115-*e* may then determine a transmit power for a subsequent transmission to UE 115-*f* based on the pathloss between UE 115-*e* and UE 115-*f* and the open loop parameter set indicated at 410. At 435, UE 115-*e* may transmit another sidelink transmission to UE 115-*f* with the determined transmit power.

In some cases, rather than using the open loop parameter set indicated at 410 to determine the transmit power for the sidelink transmission, UE 115-*e* may receive an indication of an open loop parameter set ($\{P0_{SL}, \alpha_{SL}\}$) from UE 115-*f* (e.g., for PSSCH reception). UE 115-*e* may use the open loop parameter set received from the UE 115-*f* to determine the transmit power for the sidelink transmission. Similarly, rather than using the open loop parameter set indicated at 410 to determine the transmit power for transmitting the RSRP report, UE 115-*f* may receive an indication of a desired open loop parameter set ($\{P0_{SL}, \alpha_{SL}\}$) from UE 115-*e* (e.g., for PSFCH reception), and UE 115-*f* may use the desired open loop parameter set to determine the transmit power for transmitting the RSRP report. In other cases, UE 115-*e* and UE 115-*f* may receive a transmit power command (TPC) indicating a transmit power to use for sidelink transmissions, and UE 115-*e* and UE 115-*f* may determine the transmit power for sidelink transmissions based on the TPC (e.g., for non-V2X sidelink communications, like coverage enhancement, where power control parameters may be set dynamically). In some examples, a TPC command may not be supported for V2X sidelink communications as resource pools are associated with a transmit power and with distributed resource allocations. Additionally or Alternatively, congestion and resource management across UEs may be challenging.

Figure 5:
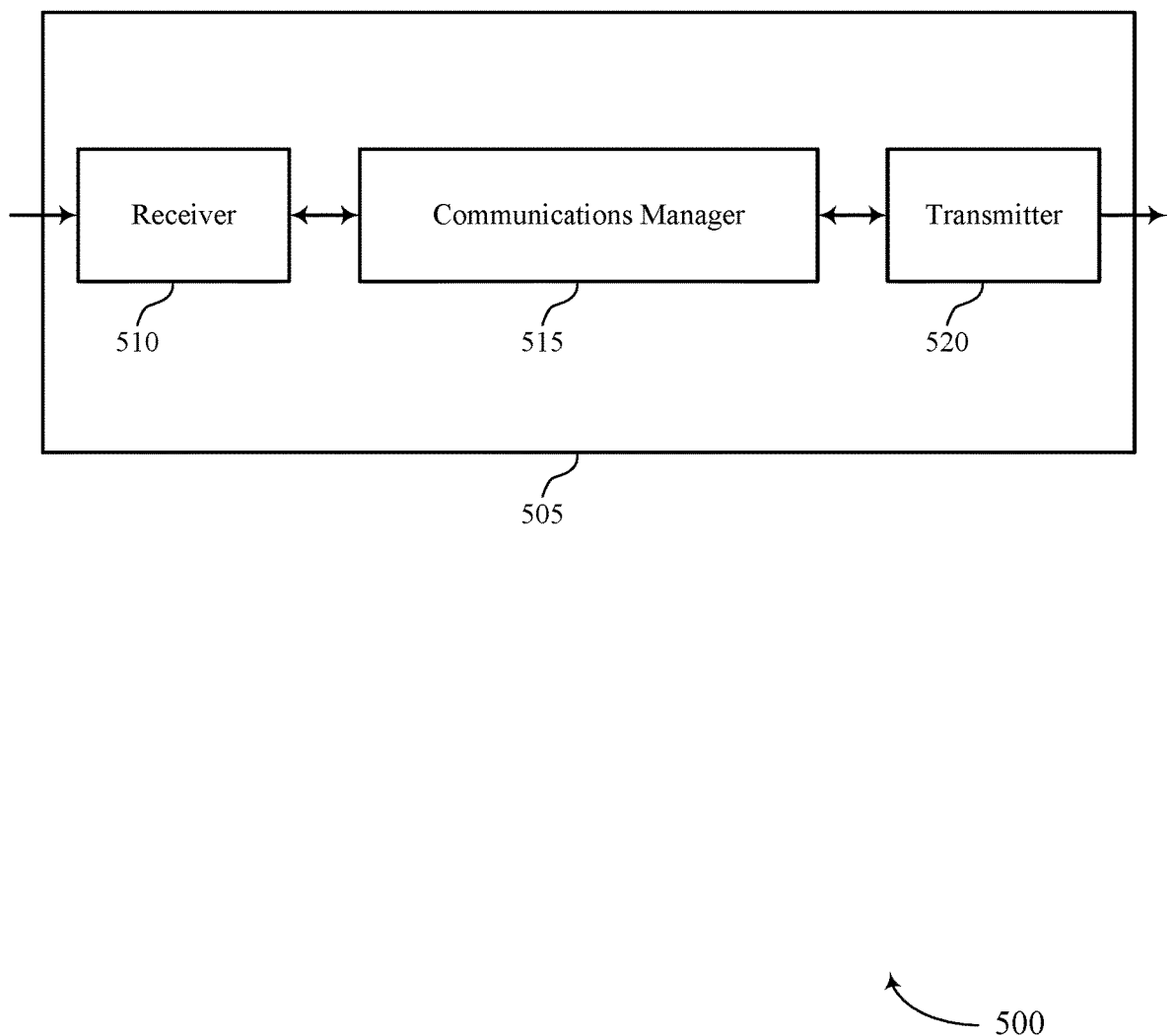
FIGS. 5 and 6 show block diagrams of devices that support sidelink power control in accordance with aspects of the present disclosure.

FIG. 5 shows a block diagram 500 of a device 505 that supports sidelink power control in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to sidelink power control, etc.). Information may be passed on to other components of the device 505. The receiver 510 may be an example of aspects of the transceiver 820 described with reference to FIG. 8. The receiver 510 may utilize a single antenna or a set of antennas.

In some cases, the device 505 may operate as a first (e.g., receiving) UE 115 in a sidelink configuration. The communications manager 515 may receive signaling indicating a set of one or more types of reference signals available for a reference signal received power measurement to support subsequent communication with a second UE over a sidelink, select, from the set, at least one type of reference signal to use for performing the reference signal received power measurement, receive, over the sidelink, a reference signal of the at least one type from the second UE, perform the reference signal received power measurement on the received reference signal, and report the reference signal received power measurement.

In some cases, the device 505 may operate as a second (e.g., transmitting) UE 115 in a sidelink configuration. The communications manager 515 may also identify at least one type of reference signal from a set of one or more types of reference signals to transmit to a first UE over a sidelink, where the at least one type of reference signal is to support a reference signal received power measurement by the first UE, transmit, to the first UE over the sidelink, control information indicating resources on which a reference signal of the at least one type is to be transmitted to the first UE, and transmit, to the first UE over the sidelink, the reference signal of the at least one type on the indicated resources. The communications manager 515 may be an example of aspects of the communications manager 810 described herein.

The actions performed by the communications manager 505 as described herein may be implemented to realize one or more potential advantages. One implementation may allow a receive UE to identify suitable reference signals to use for performing and reporting RSRP measurements to a transmit UE. Accordingly, the transmit UE may be able to determine a suitable transmit power for subsequent sidelink transmissions. In addition, a processor at the receive UE may avoid performing RSRP measurements on all reference signals since the receive UE may be configured to identify certain reference signals to use for performing and reporting RSRP measurements to a transmit UE. Another implementation may allow the transmit UE to limit power consumption, since the transmit UE may be able to determine a suitable transmit power for sidelink transmissions. Another implementation may allow a receive UE to identify suitable timing and a suitable channel for reporting RSRP measurements to prevent interference and improve throughput in a wireless communications system.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or any combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
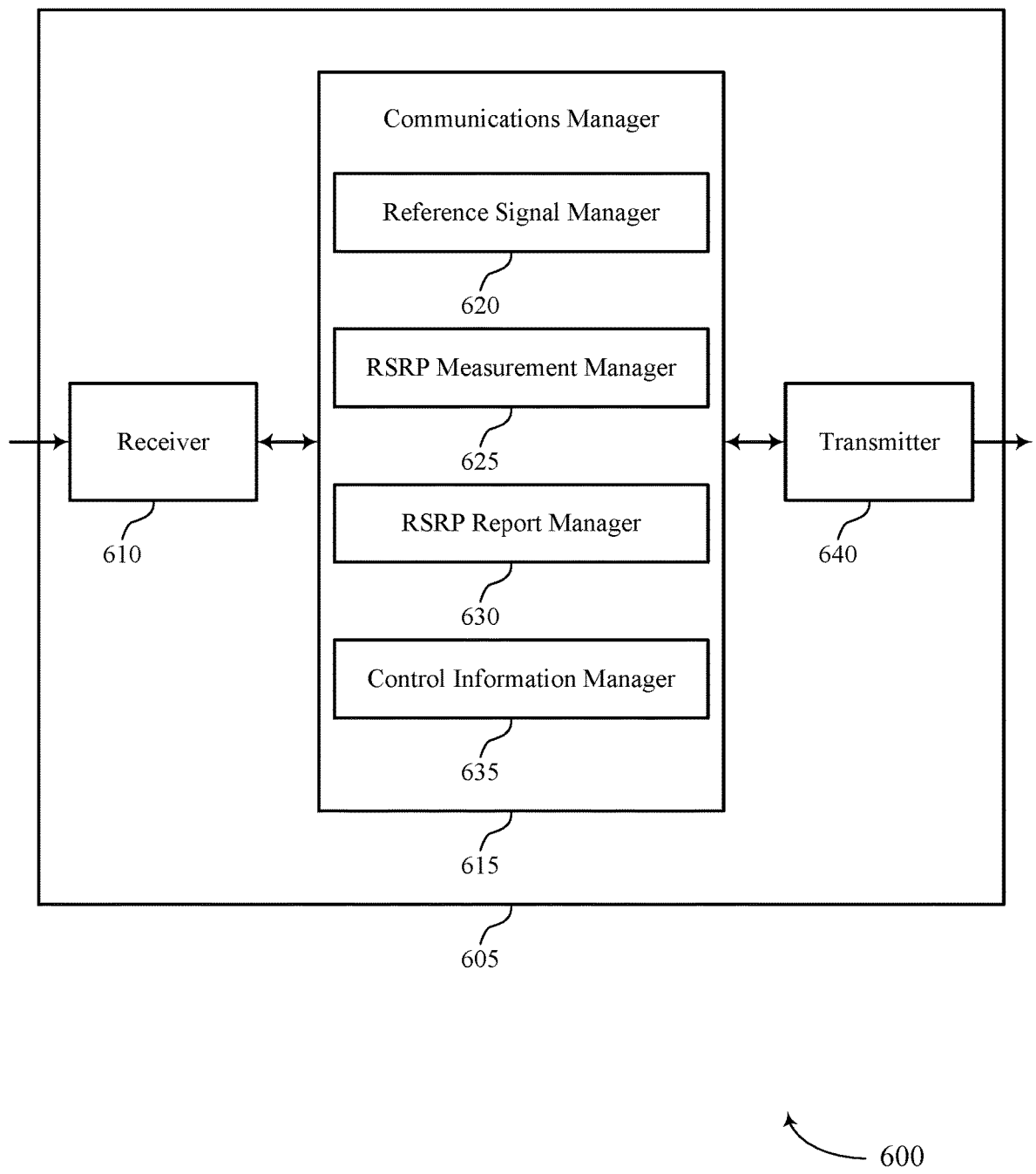

FIG. 6 shows a block diagram 600 of a device 605 that supports sidelink power control in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to sidelink power control, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a reference signal manager 620, a RSRP measurement manager 625, a RSRP report manager 630, and a control information manager 635. The communications manager 615 may be an example of aspects of the communications manager 810 described herein.

In some cases, the device 605 may operate as a first (e.g., receiving) UE 115 in a sidelink configuration. The reference signal manager 620 may receive signaling indicating a set of one or more types of reference signals available for a reference signal received power measurement to support subsequent communication with a second UE over a sidelink, select, from the set, at least one type of reference signal to use for performing the reference signal received power measurement, and receive, over the sidelink, a reference signal of the at least one type from the second UE. The RSRP measurement manager 625 may perform the reference signal received power measurement on the received reference signal. The RSRP report manager 630 may report the reference signal received power measurement.

In some cases, the device 605 may operate as a second (e.g., transmitting) UE 115 in a sidelink configuration. The reference signal manager 620 may identify at least one type of reference signal from a set of one or more types of reference signals to transmit to a first UE over a sidelink, where the at least one type of reference signal is to support a reference signal received power measurement by the first UE. The control information manager 635 may transmit, to the first UE over the sidelink, control information indicating resources on which a reference signal of the at least one type is to be transmitted to the first UE. The reference signal manager 620 may transmit, to the first UE over the sidelink, the reference signal of the at least one type on the indicated resources The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
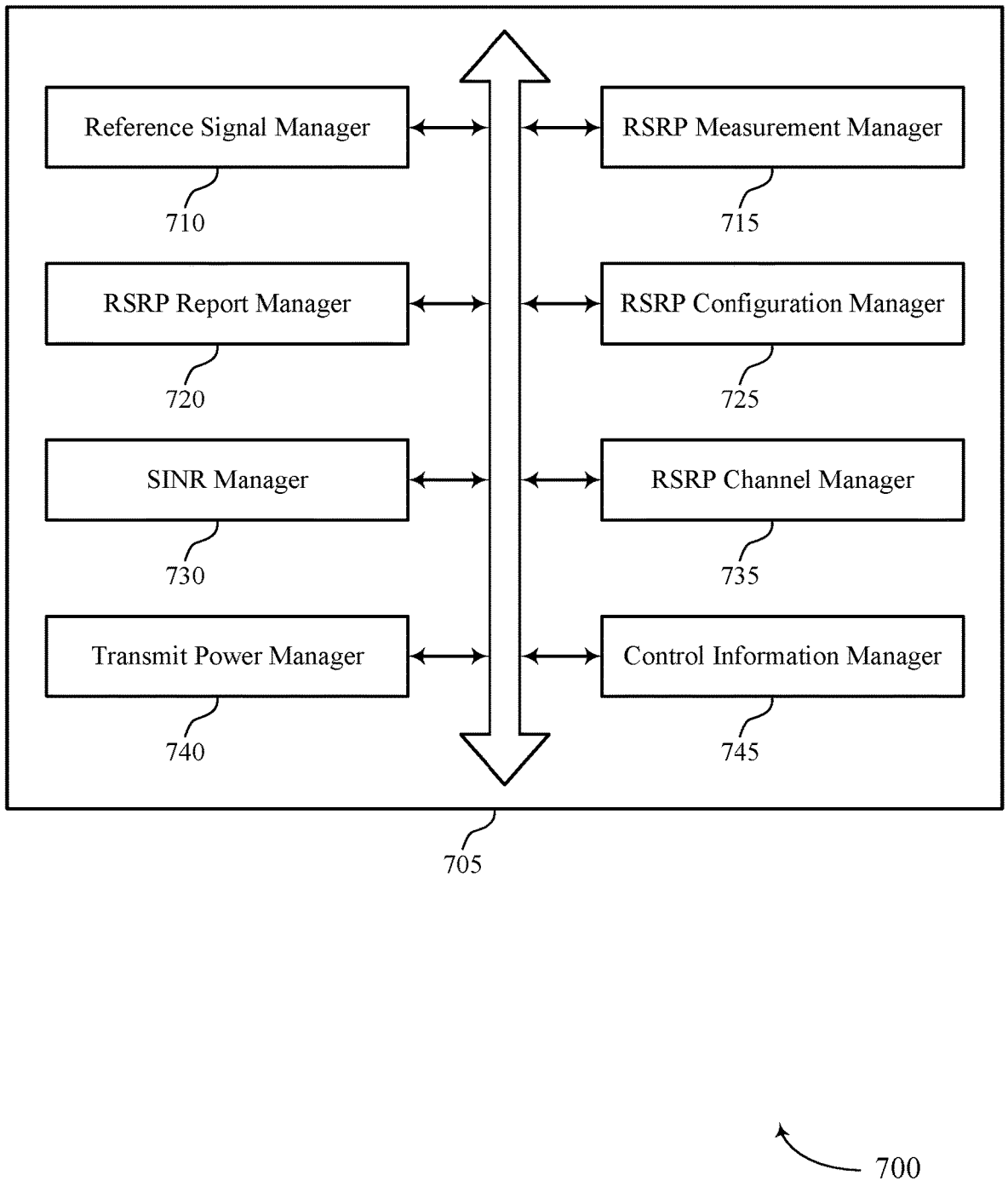
FIG. 7 shows a block diagram of a communications manager that supports sidelink power control in accordance with aspects of the present disclosure.

FIG. 7 shows a block diagram 700 of a communications manager 705 that supports sidelink power control in accordance with aspects of the present disclosure. The communications manager 705 may be an example of aspects of a communications manager 515, a communications manager 615, or a communications manager 810 described herein. The communications manager 705 may include a reference signal manager 710, a RSRP measurement manager 715, a RSRP report manager 720, a RSRP configuration manager 725, a SINR manager 730, a RSRP channel manager 735, a transmit power manager 740, and a control information manager 745. Each of these modules may communicate, directly or indirectly, with one another (e.g., via one or more buses).

In some cases, the device 705 may operate as a first (e.g., receiving) UE 115 in a sidelink configuration. The reference signal manager 710 may receive signaling indicating a set of one or more types of reference signals available for a reference signal received power measurement to support subsequent communication with a second UE over a sidelink. In some examples, the reference signal manager 710 may select, from the set, at least one type of reference signal to use for performing the reference signal received power measurement. In some examples, the reference signal manager 710 may receive, over the sidelink, a reference signal of the at least one type from the second UE. The RSRP measurement manager 715 may perform the reference signal received power measurement on the received reference signal. The RSRP report manager 720 may report the reference signal received power measurement.

The reference signal manager 710 may receive control information indicating resources on which the reference signal of the at least one type is to be received. In some examples, the reference signal manager 710 may select the at least one type of reference signal for performing the reference signal received power measurement based on receiving the control information. In some cases, the resources on which the reference signal of the at least one type is to be received include aperiodic resources, semi-persistent resources, or periodic resources. In some cases, the control information includes downlink control information from a base station or sidelink control information from the second UE.

In some cases, the set of one or more types of reference signals includes sounding reference signals (SRSs), demodulation reference signals (DMRSs), sidelink channel state information reference signals (SL-CSI-RSs), sidelink synchronization signal blocks (SL-SSBs), or any combination thereof. The RSRP configuration manager 725 may receive control information indicating that the first UE is to report the reference signal power measurement in response to the received reference signal. In some examples, the RSRP report manager 720 may report the reference signal received power measurement based on receiving the control information. In some cases, the control information includes DCI from a base station or SCI from the second UE.

The SINR manager 730 may determine that the signal to interference plus noise ratio of the received reference signal is above a threshold or below a threshold. In some examples, the RSRP report manager 720 may report the reference signal received power measurement based on the determining. In some examples, the RSRP configuration manager 725 may identify a periodicity for reporting the reference signal received power measurements. In some examples, the RSRP report manager 720 may report the reference signal received power measurement based on the identified periodicity. In some examples, the RSRP configuration manager 725 may identify a periodicity and a duration for reporting reference signal received power measurements. In some examples, the RSRP configuration manager 725 may receive control information activating reporting of reference signal received power measurements. In some examples, the RSRP report manager 720 may report the reference signal received power measurement based on the identified periodicity and duration.

The RSRP channel manager 735 may receive control information indicating that the first UE is to report the reference signal received power measurement on a PUSCH or a PUCCH. In some examples, the RSRP report manager 720 may report the reference signal received power measurement on the PUSCH or the PUCCH to a base station based on receiving the control information. In some cases, the control information includes DCI from a base station. In some examples, the RSRP channel manager 735 may receive control information indicating that the first UE is to report the reference signal received power measurement on a PSSCH or a PSFCH. In some examples, the RSRP report manager 720 may report the reference signal received power measurement on the PSSCH or the PSFCH to the second UE based on receiving the control information. In some cases, the control information includes SCI from the second UE.

In some examples, the RSRP channel manager 735 may identify, based on an indication in the signaling, a channel on which to report the reference signal received power measurement. In some examples, the RSRP report manager 720 may report the reference signal received power measurement on the channel. In some examples, the RSRP channel manager 735 may determine that the first UE is scheduled to report the reference signal received power measurement and to transmit uplink data or UCI to a base station in a same time interval. In some examples, the RSRP report manager 720 may report the reference signal received power measurements on a PSSCH or a PSFCH to the second UE based on the determining. In some cases, the signaling configures a first group of open loop parameter sets for the first UE to use to calculate a transmit power for transmissions to a base station on an uplink, and where the signaling configures a second group of open loop parameter sets for the first UE to use to calculate a transmit power for transmissions to the second UE on the sidelink.

The transmit power manager 740 may receive control information indicating an open loop parameter set in the first group for the first UE to use to calculate the transmit power for reporting the reference signal received power measurement to the base station on the uplink, or transmit power manager 740 may receive control information indicating an open loop parameter set in the second group for the first UE to use to calculate the transmit power for reporting the reference signal received power measurements to the second UE on the sidelink. In some examples, the transmit power manager 740 may receive an indication of a transmit power used by the second UE to transmit the reference signal. In some examples, the transmit power manager 740 may determine a pathloss associated with the sidelink based on the transmit power used by the second UE to transmit the reference signal and the reference signal received power measurement. In some examples, the transmit power manager 740 may determine a transmit power for reporting the reference signal received power measurement based on the pathloss, where the reporting is to the second UE.

In some examples, the transmit power manager 740 may receive, from the second UE, an indication of an open loop parameter set for determining the transmit power for reporting the reference signal received power measurement. In some examples, the transmit power manager 740 may determine a transmit power for reporting the reference signal received power measurement based on the open loop parameter set. In some examples, the transmit power manager 740 may receive a TPC indicating a transmit power for reporting the reference signal received power measurement. In some examples, the transmit power manager 740 may determine the transmit power for reporting the reference signal received power measurement based on the TPC. In some cases, the signaling indicating the set of one or more types of reference signals available for performing the reference signal received power measurement is higher layer signaling.

In some cases, the device 705 may operate as a second (e.g., transmitting) UE 115 in a sidelink configuration. In some examples, the reference signal manager 710 may identify at least one type of reference signal from a set of one or more types of reference signals to transmit to a first UE over a sidelink, where the at least one type of reference signal is to support a reference signal received power measurement by the first UE. The control information manager 745 may transmit, to the first UE over the sidelink, control information indicating resources on which a reference signal of the at least one type is to be transmitted to the first UE. In some examples, the reference signal manager 710 may transmit, to the first UE over the sidelink, the reference signal of the at least one type on the indicated resources.

In some examples, the RSRP report manager 720 may receive a reference signal received power measurement from the first UE, the reference signal received power measurement being based on the reference signal. In some examples, the RSRP report manager 720 may forward the reference signal received power measurement to a base station. In some examples, the transmit power manager 740 may determine a transmit power for a subsequent transmission to the first UE over the sidelink based on the reference signal received power measurement. In some cases, the control information further indicates that the first UE is to report the reference signal received power measurement based on the transmitted reference signal. In some cases, the control information further indicates that the first UE is to report the reference signal received power measurement on a PUSCH, a PUCCH, a PSSCH, or a PSFCH.

In some examples, the reference signal manager 710 may transmit, to the first UE over the sidelink, signaling indicating the set of one or more types of reference signals, where the set of one or more types of reference signals corresponds to types of reference signals available for reference signal received power measurements by the first UE. In some cases, the signaling configures a first group of open loop parameter sets available for the first UE to use to calculate a transmit power for transmissions to a base station on an uplink, and where the signaling configures a second group of open loop parameter sets available for the first UE to use to calculate a transmit power for transmissions to the second UE on the sidelink.

In some examples, the transmit power manager 740 may transmit, to the first UE over the sidelink, an indication of an open loop parameter set in the first group for the first UE to use to calculate a transmit power for reporting the reference signal received power measurements to the base station on the uplink, or transmit power manager 740 may transmit, to the first UE over the sidelink, an indication of an open loop parameter set in the second group for the first UE to use to calculate a transmit power for reporting the reference signal received power measurements to the second UE on the sidelink. In some cases, the signaling indicating the set of one or more types of reference signals available for performing the reference signal received power measurement is higher layer signaling.

In some examples, the transmit power manager 740 may transmit, to the first UE over the sidelink, an indication of a transmit power used to transmit the reference signal. In some examples, the transmit power manager 740 may receive, from the first UE over the sidelink, an indication of an open loop parameter set for determining a transmit power for transmitting the reference signal. In some examples, the transmit power manager 740 may determine the transmit power for transmitting the reference signal based on the open loop parameter set. In some examples, the transmit power manager 740 may receive a TPC indicating a transmit power for transmitting the reference signal. In some examples, the transmit power manager 740 may determine the transmit power for transmitting the reference signal based on the TPC.

Figure 8:
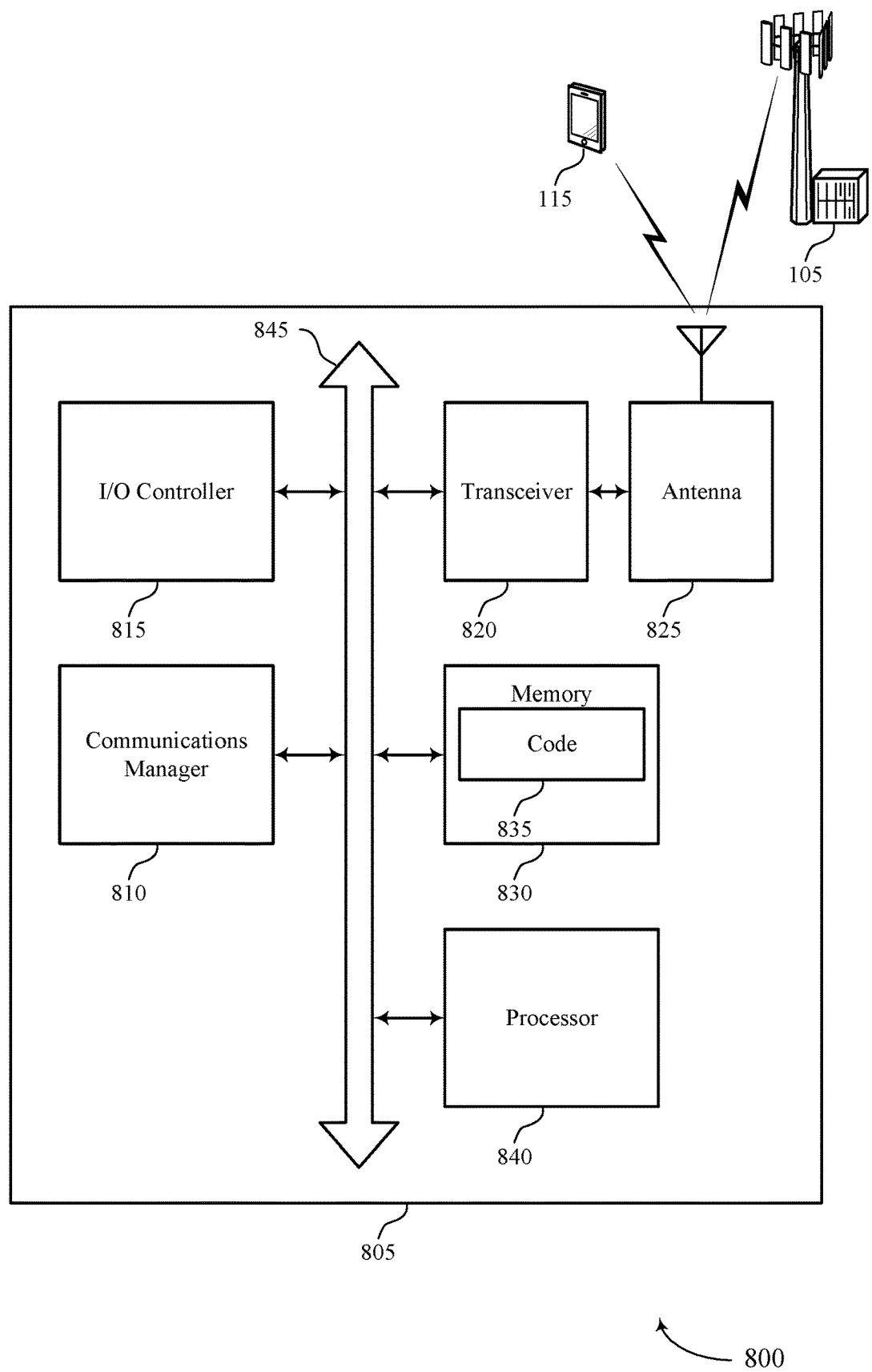
FIG. 8 shows a diagram of a system including a device that supports sidelink power control in accordance with aspects of the present disclosure.

FIG. 8 shows a diagram of a system 800 including a device 805 that supports sidelink power control in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive signaling indicating a set of one or more types of reference signals available for a reference signal received power measurement to support subsequent communication with a second UE over a sidelink, select, from the set, at least one type of reference signal to use for performing the reference signal received power measurement, receive, over the sidelink, a reference signal of the at least one type from the second UE, perform the reference signal received power measurement on the received reference signal, and report the reference signal received power measurement.

The communications manager 810 may also identify at least one type of reference signal from a set of one or more types of reference signals to transmit to a first UE over a sidelink, where the at least one type of reference signal is to support a reference signal received power measurement by the first UE, transmit, to the second UE over the sidelink, the reference signal of the at least one type on the indicated resources, and transmit, to the second UE over the sidelink, control information indicating resources on which a reference signal of the at least one type is to be transmitted to the second UE.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting sidelink power control).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
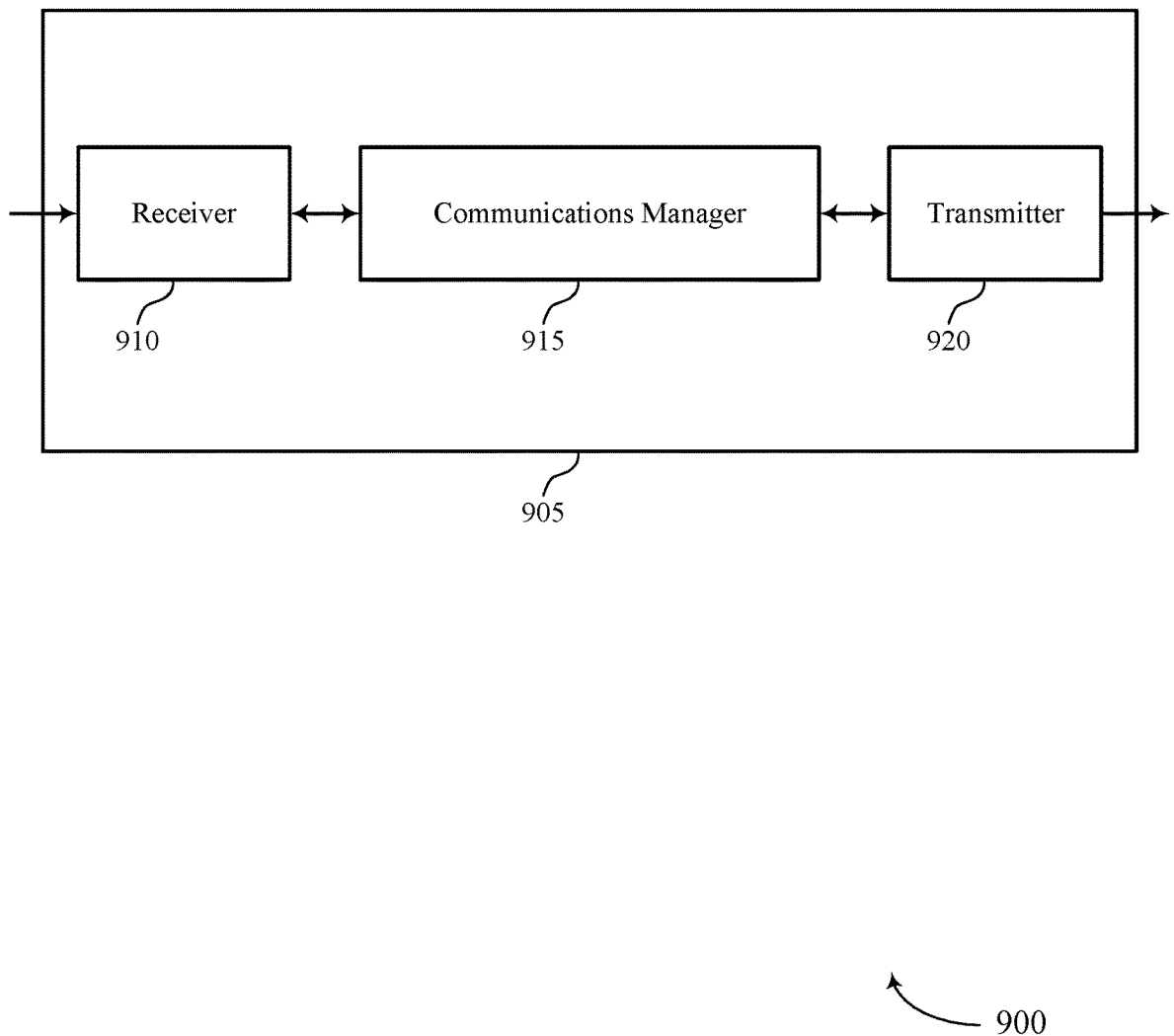
FIGS. 9 and 10 show block diagrams of devices that support sidelink power control in accordance with aspects of the present disclosure.

FIG. 9 shows a block diagram 900 of a device 905 that supports sidelink power control in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to sidelink power control, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a first UE in communications with a second UE over a sidelink, identify at least one type of reference signal from a set of one or more types of reference signals for the second UE to transmit to the first UE, where the at least one type of reference signal is to be used by the first UE for performing a reference signal received power measurement, and transmit, to the first UE and the second UE, control information indicating resources on which a reference signal of the at least one type is to be transmitted by the second UE to the first UE. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or any combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
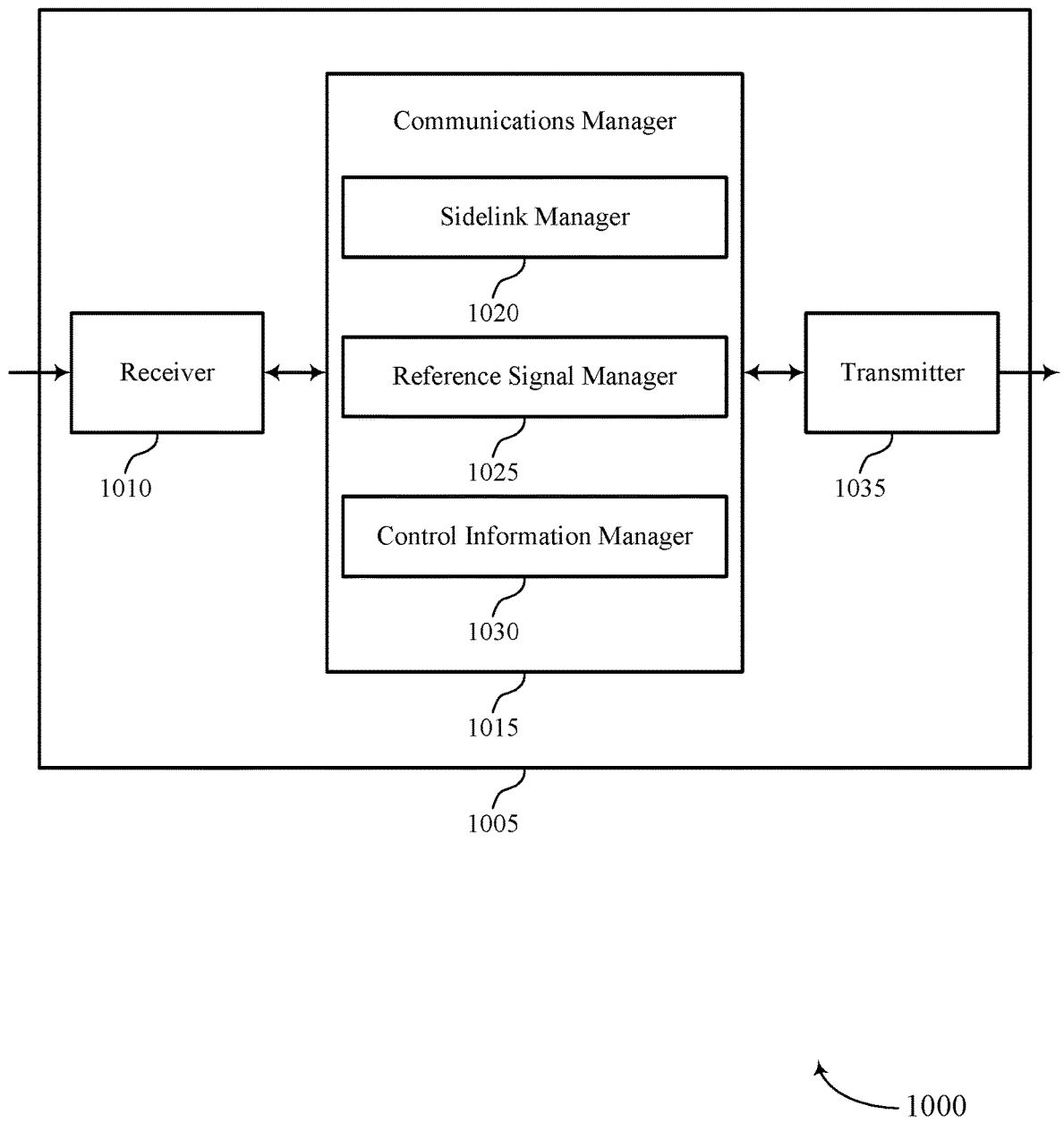

FIG. 10 shows a block diagram 1000 of a device 1005 that supports sidelink power control in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to sidelink power control, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a sidelink manager 1020, a reference signal manager 1025, and a control information manager 1030. The communications manager 1015 may be an example of aspects of the communications manager 1210 described herein.

The sidelink manager 1020 may identify a first UE in communications with a second UE over a sidelink. The reference signal manager 1025 may identify at least one type of reference signal from a set of one or more types of reference signals for the second UE to transmit to the first UE, where the at least one type of reference signal is to be used by the first UE for performing a reference signal received power measurement. The control information manager 1030 may transmit, to the first UE and the second UE, control information indicating resources on which a reference signal of the at least one type is to be transmitted by the second UE to the first UE.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
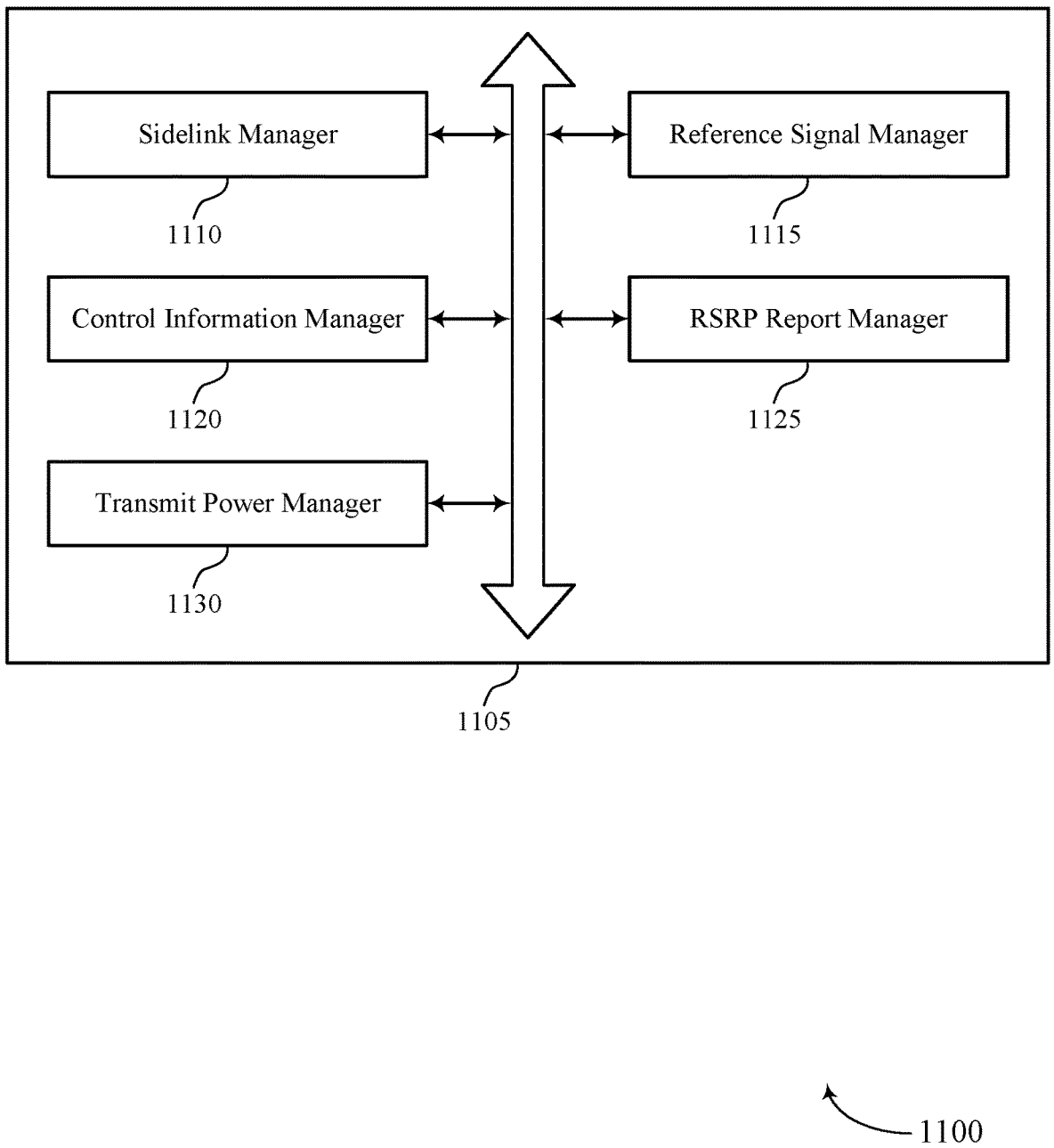
FIG. 11 shows a block diagram of a communications manager that supports sidelink power control in accordance with aspects of the present disclosure.

FIG. 11 shows a block diagram 1100 of a communications manager 1105 that supports sidelink power control in accordance with aspects of the present disclosure. The communications manager 1105 may be an example of aspects of a communications manager 915, a communications manager 1015, or a communications manager 1210 described herein. The communications manager 1105 may include a sidelink manager 1110, a reference signal manager 1115, a control information manager 1120, a RSRP report manager 1125, and a transmit power manager 1130. Each of these modules may communicate, directly or indirectly, with one another (e.g., via one or more buses).

The sidelink manager 1110 may identify a first UE in communications with a second UE over a sidelink. The reference signal manager 1115 may identify at least one type of reference signal from a set of one or more types of reference signals for the second UE to transmit to the first UE, where the at least one type of reference signal is to be used by the first UE for performing a reference signal received power measurement. The control information manager 1120 may transmit, to the first UE and the second UE, control information indicating resources on which a reference signal of the at least one type is to be transmitted by the second UE to the first UE.

The RSRP report manager 1125 may receive, from the first UE or from the second UE, a reference signal received power measurement performed by the first UE. The transmit power manager 1130 may determine a transmit power for the second UE to use for a subsequent transmission to the first UE over the sidelink based on the reference signal received power measurement. In some examples, the transmit power manager 1130 may transmit a TPC indicating the transmit power for the second UE to use for the subsequent transmission to the first UE. In some cases, the signaling indicating the set of one or more types of reference signals available for reference signal received power measurements by the first UE is higher layer signaling. In some cases, the control information further indicates that the first UE is to report the reference signal received power measurement in response to the reference signal. In some cases, the control information further indicates that the first UE is to report the reference signal received power measurement on a PUSCH, a PUCCH, a PSSCH, or a PSFCH.

In some examples, the reference signal manager 1115 may transmit signaling indicating the set of one or more types of reference signals, where the set of one or more types of reference signals corresponds to types of reference signals available for reference signal received power measurements by the first UE. In some cases, the signaling configures a first group of open loop parameter sets for the first UE or the second UE to use to calculate a transmit power for transmissions to the base station on an uplink, and where the signaling configures a second group of open loop parameter sets for the first UE or the second UE to use to calculate a transmit power for transmissions over the sidelink.

In some examples, the transmit power manager 1130 may transmit an indication of an open loop parameter set in the first group for the first UE to use to calculate the transmit power for reporting the reference signal received power measurements to the base station on the uplink, or transmit power manager 1130 may transmit an indication of open loop parameters in the second set for the first UE to use to calculate the transmit power for reporting the reference signal received power measurements to the second UE on the sidelink.

Figure 12:
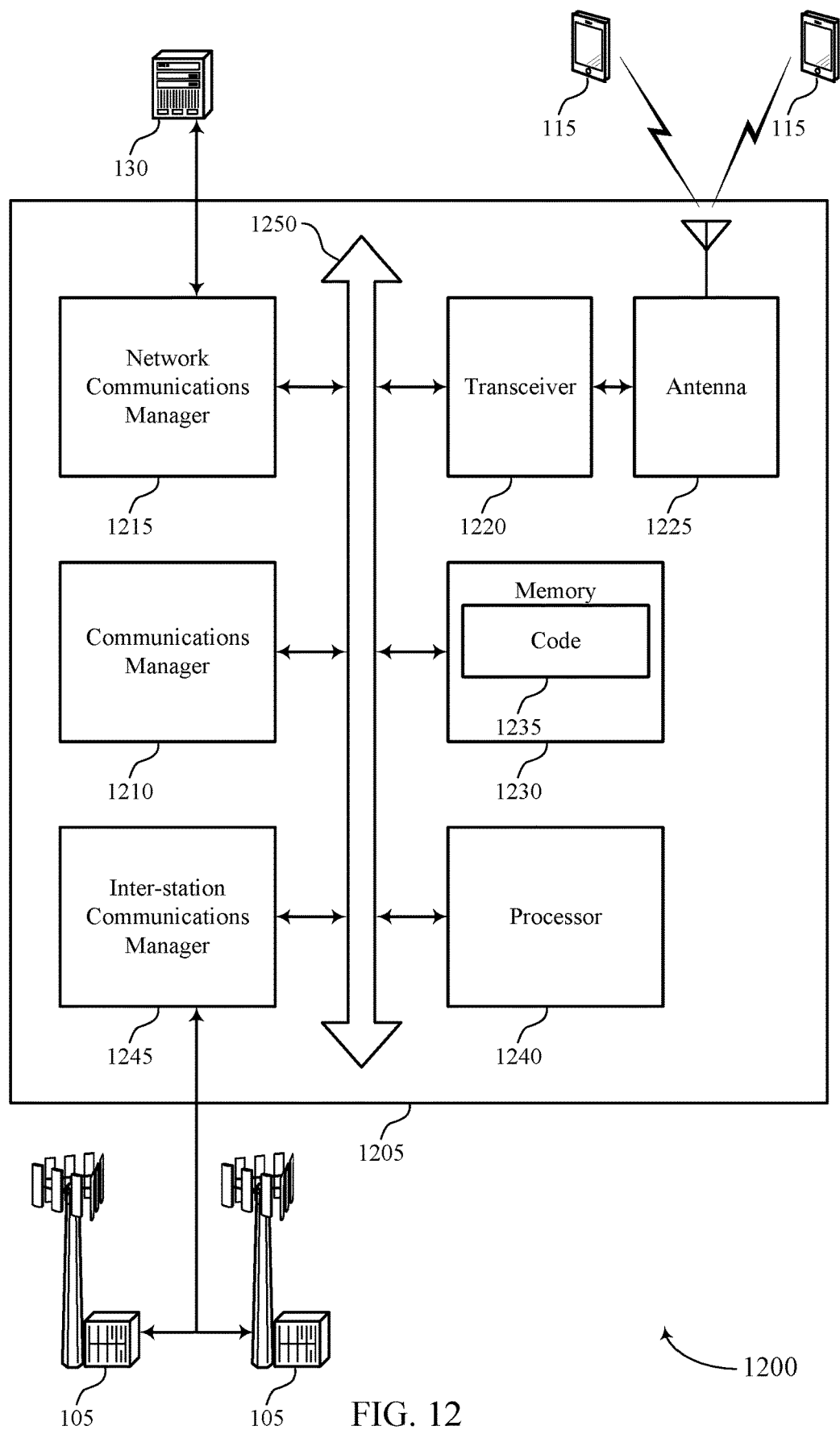
FIG. 12 shows a diagram of a system including a device that supports sidelink power control in accordance with aspects of the present disclosure.

FIG. 12 shows a diagram of a system 1200 including a device 1205 that supports sidelink power control in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a first UE in communications with a second UE over a sidelink, identify at least one type of reference signal from a set of one or more types of reference signals for the second UE to transmit to the first UE, where the at least one type of reference signal is to be used by the first UE for performing a reference signal received power measurement, and transmit, to the first UE and the second UE, control information indicating resources on which a reference signal of the at least one type is to be transmitted by the second UE to the first UE.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or any combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting sidelink power control).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
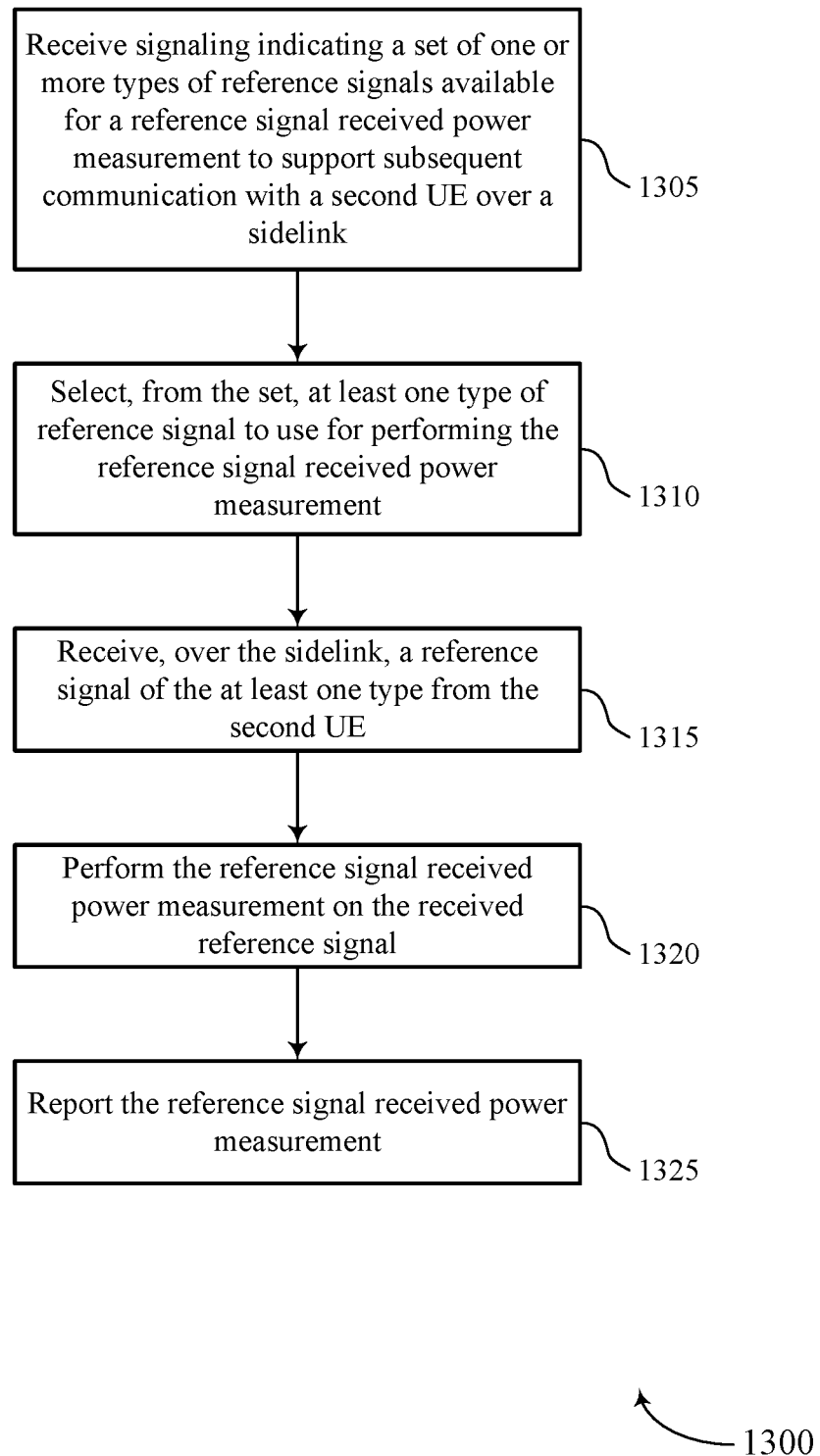
FIGS. 13 through 15 show flowcharts illustrating methods that support sidelink power control in accordance with aspects of the present disclosure.

FIG. 13 shows a flowchart illustrating a method 1300 that supports sidelink power control in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1305, the UE may receive signaling indicating a set of one or more types of reference signals available for a reference signal received power measurement to support subsequent communication with a second UE over a sidelink. The operations of 1305 may be performed according to the methods described herein. In some examples, aspects of the operations of 1305 may be performed by a reference signal manager as described with reference to FIGS. 5 through 8.

At 1310, the UE may select, from the set, at least one type of reference signal to use for performing the reference signal received power measurement. The operations of 1310 may be performed according to the methods described herein. In some examples, aspects of the operations of 1310 may be performed by a reference signal manager as described with reference to FIGS. 5 through 8.

At 1315, the UE may receive, over the sidelink, a reference signal of the at least one type from the second UE. The operations of 1315 may be performed according to the methods described herein. In some examples, aspects of the operations of 1315 may be performed by a reference signal manager as described with reference to FIGS. 5 through 8.

At 1320, the UE may perform the reference signal received power measurement on the received reference signal. The operations of 1320 may be performed according to the methods described herein. In some examples, aspects of the operations of 1320 may be performed by a RSRP measurement manager as described with reference to FIGS. 5 through 8.

At 1325, the UE may report the reference signal received power measurement. The operations of 1325 may be performed according to the methods described herein. In some examples, aspects of the operations of 1325 may be performed by a RSRP report manager as described with reference to FIGS. 5 through 8.

Figure 14:
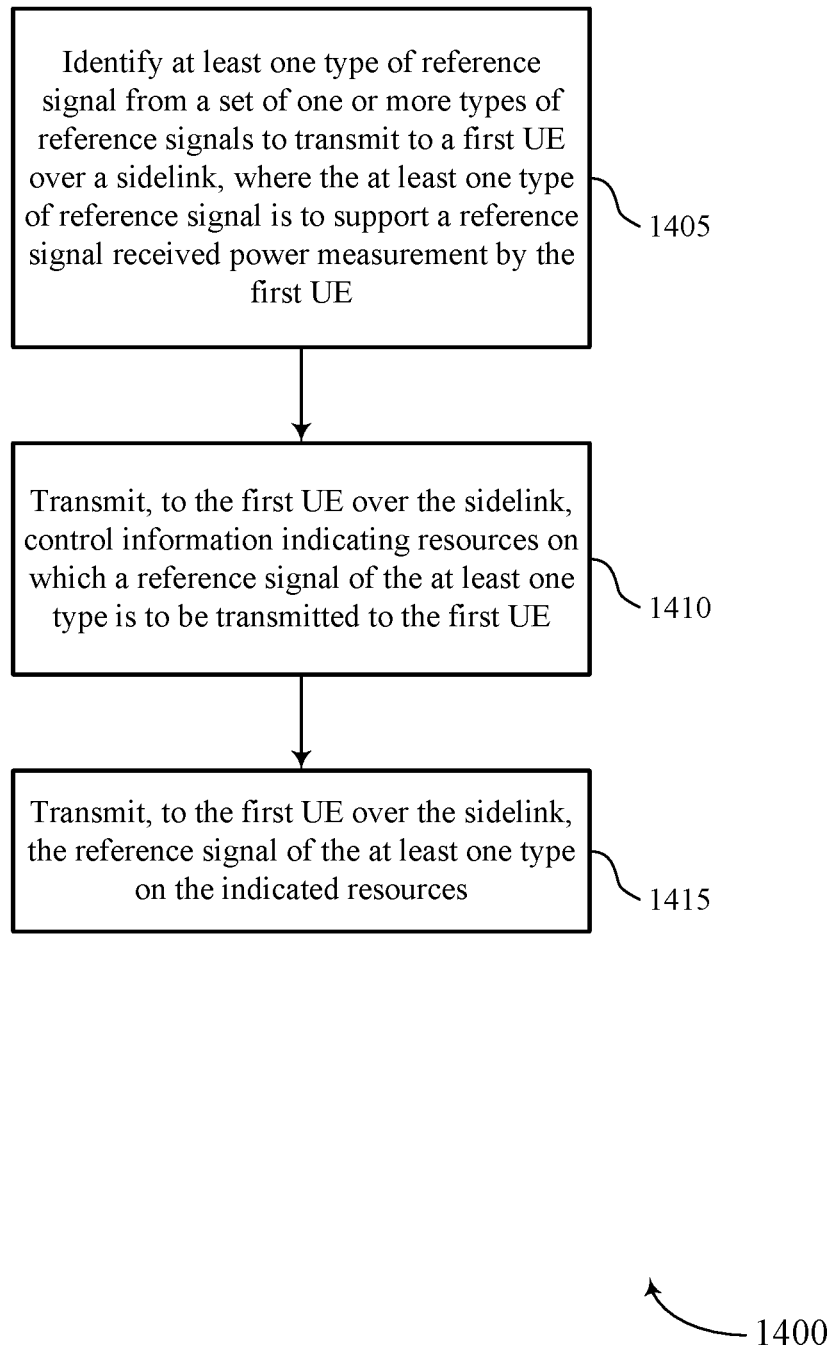

FIG. 14 shows a flowchart illustrating a method 1400 that supports sidelink power control in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 1405, the UE may identify at least one type of reference signal from a set of one or more types of reference signals to transmit to a first UE over a sidelink, where the at least one type of reference signal is to support a reference signal received power measurement by the first UE. The operations of 1405 may be performed according to the methods described herein. In some examples, aspects of the operations of 1405 may be performed by a reference signal manager as described with reference to FIGS. 5 through 8.

At 1410, the UE may transmit, to the first UE over the sidelink, control information indicating resources on which a reference signal of the at least one type is to be transmitted to the first UE. The operations of 1410 may be performed according to the methods described herein. In some examples, aspects of the operations of 1410 may be performed by a control information manager as described with reference to FIGS. 5 through 8.

At 1415, the UE may transmit, to the first UE over the sidelink, the reference signal of the at least one type on the indicated resources. The operations of 1415 may be performed according to the methods described herein. In some examples, aspects of the operations of 1415 may be performed by a reference signal manager as described with reference to FIGS. 5 through 8.

Figure 15:
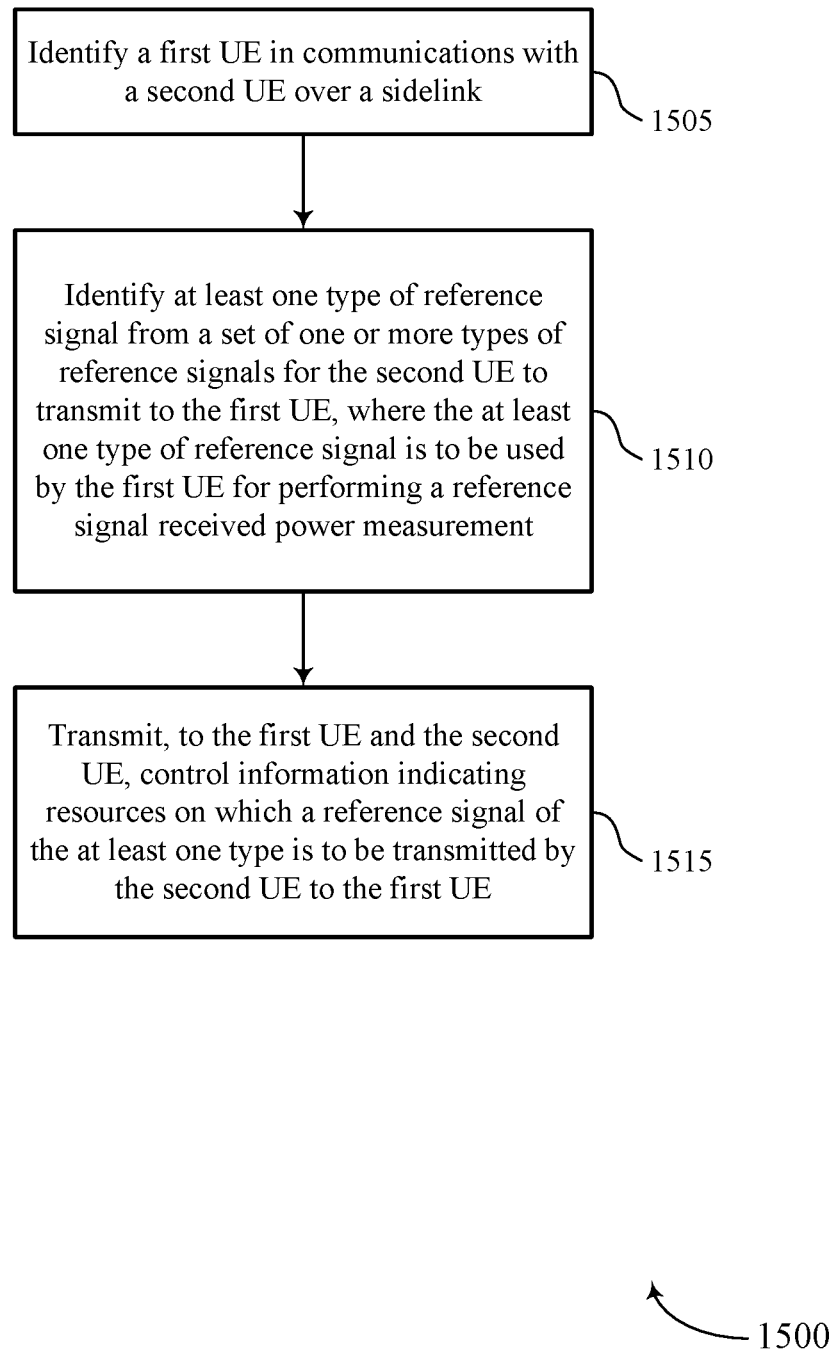

FIG. 15 shows a flowchart illustrating a method 1500 that supports sidelink power control in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1505, the base station may identify a first UE in communications with a second UE over a sidelink. The operations of 1505 may be performed according to the methods described herein. In some examples, aspects of the operations of 1505 may be performed by a sidelink manager as described with reference to FIGS. 9 through 12.

At 1510, the base station may identify at least one type of reference signal from a set of one or more types of reference signals for the second UE to transmit to the first UE, where the at least one type of reference signal is to be used by the first UE for performing a reference signal received power measurement. The operations of 1510 may be performed according to the methods described herein. In some examples, aspects of the operations of 1510 may be performed by a reference signal manager as described with reference to FIGS. 9 through 12.

At 1515, the base station may transmit, to the first UE and the second UE, control information indicating resources on which a reference signal of the at least one type is to be transmitted by the second UE to the first UE. The operations of 1515 may be performed according to the methods described herein. In some examples, aspects of the operations of 1515 may be performed by a control information manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as any combination of computing devices (e.g., any combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving signaling indicating a set of two or more types of reference signals available for a reference signal received power measurement to support subsequent communication with a second UE over a sidelink, wherein the signaling configures a first group of open loop parameter sets available for the first UE to use to calculate a transmit power for transmissions to a network node on an uplink, and wherein the signaling configures a second group of open loop parameter sets available for the first UE to use to calculate a transmit power for transmissions to the second UE on the sidelink;
   selecting, from the set, at least one type of reference signal to use for performing the reference signal received power measurement;
   receiving, over the sidelink, a reference signal of the at least one type from the second UE;
   performing the reference signal received power measurement on the received reference signal; and
   reporting the reference signal received power measurement using a transmit power that is based at least in part on a first open loop parameter set in the first group of open loop parameter sets, a second open loop parameter set in the second group of open loop parameter sets, or both.

2. The method of claim 1, wherein selecting the at least one type of reference signal from the set to use for the reference signal received power measurement comprises:
   receiving control information indicating resources on which the reference signal of the at least one type is to be received; and
   selecting the at least one type of reference signal for performing the reference signal received power measurement based at least in part on receiving the control information.

3. The method of claim 2, wherein the resources on which the reference signal of the at least one type is to be received comprise aperiodic resources, semi-persistent resources, or periodic resources.

4. The method of claim 2, wherein the control information comprises downlink control information from the network node or sidelink control information from the second UE.

5. The method of claim 1, wherein the set of two or more types of reference signals comprises sounding reference signals (SRSs), demodulation reference signals (DMRSs), sidelink channel state information reference signals (SL-CSI-RSs), sidelink synchronization signal blocks (SL-SSBs), or any combination thereof.

6. The method of claim 1, wherein the first UE is configured to report reference signal received power measurements aperiodically, the method further comprising:
   receiving control information indicating that the first UE is to report the reference signal received power measurement in response to the received reference signal; and
   reporting the reference signal received power measurement based at least in part on receiving the control information.

7. The method of claim 6, wherein the control information comprises downlink control information (DCI) from the network node or sidelink control information (SCI) from the second UE.

8. The method of claim 1, wherein the first UE is configured to report reference signal received power measurements aperiodically, the method further comprising:
   determining that a signal to interference plus noise ratio of the received reference signal is above a threshold or below a threshold; and
   reporting the reference signal received power measurement based at least in part on the determining.

9. The method of claim 1, wherein the first UE is configured to report reference signal received power measurements periodically, the method further comprising:
   identifying a periodicity for reporting the reference signal received power measurements; and
   reporting the reference signal received power measurement based at least in part on the identified periodicity.

10. The method of claim 1, wherein the first UE is configured to report reference signal received power measurements semi-persistently, the method further comprising:
    identifying a periodicity and a duration for reporting reference signal received power measurements;
    receiving control information activating reporting of reference signal received power measurements; and
    reporting the reference signal received power measurement based at least in part on the identified periodicity and duration.

11. The method of claim 1, further comprising:
    receiving downlink control information (DCI) from the network node indicating that the first UE is to report the reference signal received power measurement on a physical uplink shared channel (PUSCH) or a physical uplink control channel (PUCCH); and
    reporting the reference signal received power measurement on the PUSCH or the PUCCH to the network node based at least in part on receiving the DCI.

12. The method of claim 1, further comprising:
    receiving sidelink control information (SCI) from the second UE indicating that the first UE is to report the reference signal received power measurement on a physical sidelink shared channel (PSSCH) or a physical sidelink feedback channel (PSFCH); and
    reporting the reference signal received power measurement on the PSSCH or the PSFCH to the second UE based at least in part on receiving the SCI.

13. The method of claim 1, further comprising:
    identifying, based at least in part on an indication in the signaling, a channel on which to report the reference signal received power measurement; and
    reporting the reference signal received power measurement on the channel.

14. The method of claim 1, further comprising:
    determining that the first UE is scheduled to report the reference signal received power measurement and to transmit uplink data or uplink control information (UCI) to the network node in a same time interval; and
    reporting the reference signal received power measurements on a physical sidelink shared channel (PSSCH) or a physical sidelink feedback channel (PSFCH) to the second UE based at least in part on the determining.

15. The method of claim 1, further comprising:
    receiving control information indicating the first open loop parameter set in the first group for the first UE to use to calculate the transmit power for reporting the reference signal received power measurement to the network node on the uplink; or
    receiving control information indicating the second open loop parameter set in the second group for the first UE to use to calculate the transmit power for reporting the reference signal received power measurements to the second UE on the sidelink.

16. The method of claim 1, further comprising:
receiving an indication of a transmit power used by the second UE to transmit the reference signal;
determining a pathloss associated with the sidelink based at least in part on the transmit power used by the second UE to transmit the reference signal and the reference signal received power measurement; and
determining the transmit power for reporting the reference signal received power measurement based at least in part on the pathloss, wherein the reporting is to the second UE.

17. The method of claim 1, further comprising:
receiving, from the second UE, an indication of the first open loop parameter set in the first group of open loop parameter sets, the second open loop parameter set in the second group of open loop parameter sets, or both, for determining the transmit power for reporting the reference signal received power measurement; and
determining the transmit power for reporting the reference signal received power measurement based at least in part on the first open loop parameter set, the second open loop parameter set, or both.

18. The method of claim 1, further comprising:
receiving a transmit power command (TPC) indicating the transmit power for reporting the reference signal received power measurement; and
determining the transmit power for reporting the reference signal received power measurement based at least in part on the TPC.

19. The method of claim 1, wherein the signaling indicating the set of two or more types of reference signals available for performing the reference signal received power measurement is higher layer signaling.

20. A method for wireless communication at a second user equipment (UE), comprising:
identifying at least one type of reference signal from a set of two or more types of reference signals to transmit to a first UE over a sidelink, wherein the at least one type of reference signal is to support a reference signal received power measurement by the first UE and each type of reference signal of the set is a different type of reference signal;
transmitting, to the first UE over the sidelink, signaling indicating the set of two or more types of reference signals, wherein the signaling configures a first group of open loop parameter sets available for the first UE to use to calculate a transmit power for transmissions to a network node on an uplink, and wherein the signaling configures a second group of open loop parameter sets available for the first UE to use to calculate a transmit power for transmissions to the second UE on the sidelink;
transmitting, to the first UE over the sidelink, control information indicating resources on which a reference signal of the at least one type is to be transmitted to the first UE;
transmitting, to the first UE over the sidelink, the reference signal of the at least one type on the indicated resources; and
obtaining the reference signal received power measurement via a report associated with a transmit power that is based at least in part on a second open loop parameter set in the second group of open loop parameter sets.

21. The method of claim 20, wherein the reference signal received power measurement is based at least in part on the reference signal.

22. The method of claim 21, further comprising:
forwarding the reference signal received power measurement to a network node.

23. The method of claim 21, further comprising:
determining a transmit power for a subsequent transmission to the first UE over the sidelink based at least in part on the reference signal received power measurement.

24. The method of claim 20, wherein the control information further indicates that the first UE is to report the reference signal received power measurement based at least in part on the transmitted reference signal.

25. The method of claim 20, wherein the control information further indicates that the first UE is to report the reference signal received power measurement on a physical uplink shared channel (PUSCH), a physical uplink control channel (PUCCH), a physical sidelink shared channel (PSSCH), or a physical sidelink feedback channel (PSFCH).

26. The method of claim 20, wherein the signaling comprises higher layer signaling and the set of two or more types of reference signals corresponds to types of reference signals available for reference signal received power measurements by the first UE.

27. The method of claim 20, further comprising:
transmitting, to the first UE over the sidelink, an indication of a first open loop parameter set in the first group for the first UE to use to calculate a transmit power for reporting the reference signal received power measurements to the network node on the uplink; or
transmitting, to the first UE over the sidelink, an indication of the second open loop parameter set in the second group for the first UE to use to calculate the transmit power for reporting the reference signal received power measurements to the second UE on the sidelink.

28. The method of claim 20, further comprising:
transmitting, to the first UE over the sidelink, an indication of a transmit power used to transmit the reference signal.

29. The method of claim 20, further comprising:
receiving, from the first UE over the sidelink, an indication of an open loop parameter set for determining a transmit power for transmitting the reference signal; and
determining the transmit power for transmitting the reference signal based at least in part on the open loop parameter set.

30. The method of claim 20, further comprising:
receiving a transmit power command (TPC) indicating a transmit power for transmitting the reference signal; and
determining the transmit power for transmitting the reference signal based at least in part on the TPC.

31. A method for wireless communication at a network node, comprising:
identifying a first user equipment (UE) in communications with a second UE over a sidelink;
identifying at least one type of reference signal from a set of two or more types of reference signals for the second UE to transmit to the first UE, wherein the at least one type of reference signal is to be used by the first UE for performing a reference signal received power measurement and each type of reference signal of the set is a different type of reference signal;

transmitting signaling indicating the set of two or more types of reference signals, wherein the signaling configures a first group of open loop parameter sets for the first UE or the second UE to use to calculate a transmit power for transmissions to the network node on an uplink, and wherein the signaling configures a second group of open loop parameter sets for the first UE or the second UE to use to calculate a transmit power for transmissions over the sidelink;

transmitting, to the first UE and the second UE, control information indicating resources on which a reference signal of the at least one type is to be transmitted by the second UE to the first UE; and obtaining the reference signal received power measurement via a report associated with a transmit power that is based at least in part on a first open loop parameter set in the first group of open loop parameter sets.

32. The method of claim 31, further comprising:
determining a transmit power for the second UE to use for a subsequent transmission to the first UE over the sidelink based at least in part on the reference signal received power measurement; and
transmitting a transmit power command (TPC) indicating the transmit power for the second UE to use for the subsequent transmission to the first UE.

33. The method of claim 31, wherein the control information further indicates that the first UE is to report the reference signal received power measurement in response to the reference signal.

34. The method of claim 31, wherein the control information further indicates that the first UE is to report the reference signal received power measurement on a physical uplink shared channel (PUSCH), a physical uplink control channel (PUCCH), a physical sidelink shared channel (PSSCH), or a physical sidelink feedback channel (PSFCH).

35. The method of claim 31,
wherein the signaling comprises higher layer signaling and the set of two or more types of reference signals corresponds to types of reference signals available for reference signal received power measurements by the first UE.

36. The method of claim 31, further comprising:
transmitting an indication of the first open loop parameter set in the first group for the first UE to use to calculate the transmit power for reporting the reference signal received power measurements to the network node on the uplink; or
transmitting an indication of a second open loop parameter set in the second group for the first UE to use to calculate a transmit power for reporting the reference signal received power measurements to the second UE on the sidelink.

37. An apparatus for wireless communication at a first user equipment (UE), comprising:
a processor,
memory coupled with the processor; and
instructions stored in the memory and executable by the processor to cause the apparatus to:
receive signaling indicating a set of two or more types of reference signals available for a reference signal received power measurement to support subsequent communication with a second UE over a sidelink, wherein the signaling configures a first group of open loop parameter sets available for the first UE to use to calculate a transmit power for transmissions to a network node on an uplink, and wherein the signaling configures a second group of open loop parameter sets available for the first UE to use to calculate a transmit power for transmissions to the second UE on the sidelink;
select, from the set, at least one type of reference signal to use for performing the reference signal received power measurement;
receive, over the sidelink, a reference signal of the at least one type from the second UE;
perform the reference signal received power measurement on the received reference signal; and
report the reference signal received power measurement using a transmit power that is based at least in part on a first open loop parameter set in the first group of open loop parameter sets, a second open loop parameter set in the second group of open loop parameter sets, or both.

38. The apparatus of claim 37, wherein the instructions are further executable by the processor to cause the apparatus to:
receive sidelink control information (SCI) from the second UE indicating that the first UE is to report the reference signal received power measurement on a physical sidelink shared channel (PSSCH) or a physical sidelink feedback channel (PSFCH); and
report the reference signal received power measurement on the PSSCH or the PSFCH to the second UE based at least in part on receiving the SCI.

39. An apparatus for wireless communication at a second user equipment (UE), comprising:
a processor,
memory coupled with the processor; and
instructions stored in the memory and executable by the processor to cause the apparatus to:
identify at least one type of reference signal from a set of two or more types of reference signals to transmit to a first UE over a sidelink, wherein the at least one type of reference signal is to support a reference signal received power measurement by the first UE and each type of reference signal of the set is a different type of reference signal;
transmitting, to the first UE over the sidelink, signaling indicating the set of two or more types of reference signals, wherein the signaling configures a first group of open loop parameter sets available for the first UE to use to calculate a transmit power for transmissions to a network node on an uplink, and wherein the signaling configures a second group of open loop parameter sets available for the first UE to use to calculate a transmit power for transmissions to the second UE on the sidelink:
transmit, to the first UE over the sidelink, control information indicating resources on which a reference signal of the at least one type is to be transmitted to the first UE;
transmit, to the first UE over the sidelink, the reference signal of the at least one type on the indicated resources; and
obtain the reference signal received power measurement via a report associated with a transmit power that is based at least in part on a second open loop parameter set in the second group of open loop parameter sets.

40. The apparatus of claim 39, wherein the control information further indicates that the first UE is to report the reference signal received power measurement on a physical uplink shared channel (PUSCH), a physical uplink control channel (PUCCH), a physical sidelink shared channel (PSSCH), or a physical sidelink feedback channel (PSFCH).

41. An apparatus for wireless communication at a network node, comprising:
a processor,
memory coupled with the processor; and
instructions stored in the memory and executable by the processor to cause the apparatus to:
identify a first user equipment (UE) in communications with a second UE over a sidelink;
identify at least one type of reference signal from a set of two or more types of reference signals for the second UE to transmit to the first UE, wherein the at least one type of reference signal is to be used by the first UE for performing a reference signal received power measurement and each type of reference signal of the set is a different type of reference signal;
transmitting signaling indicating the set of two or more types of reference signals, wherein the signaling configures a first group of open loop parameter sets for the first UE or the second UE to use to calculate a transmit power for transmissions to the network node on an uplink, and wherein the signaling configures a second group of open loop parameter sets for the first UE or the second UE to use to calculate a transmit power for transmissions over the sidelink;
transmit, to the first UE and the second UE, control information indicating resources on which a reference signal of the at least one type is to be transmitted by the second UE to the first UE; and
obtain the reference signal received power measurement associated with a transmit power that is based at least in part on a first open loop parameter set in the first group of open loop parameter sets.

42. The apparatus of claim 41, wherein the control information further indicates that the first UE is to report the reference signal received power measurement on a physical uplink shared channel (PUSCH), a physical uplink control channel (PUCCH), a physical sidelink shared channel (PSSCH), or a physical sidelink feedback channel (PSFCH).

* * * * *